US012326497B2

(12) United States Patent
Grebner et al.

(10) Patent No.: US 12,326,497 B2
(45) Date of Patent: Jun. 10, 2025

(54) CIRCUITRY AND METHOD

(71) Applicant: Sony Group Corporation, Tokyo (JP)

(72) Inventors: Timo Grebner, Stuttgart (DE);
Christian Waldschmidt, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 404 days.

(21) Appl. No.: 17/881,601

(22) Filed: Aug. 5, 2022

(65) Prior Publication Data

US 2023/0161026 A1 May 25, 2023

(30) Foreign Application Priority Data

Nov. 24, 2021 (EP) .................................. 21210270

(51) Int. Cl.
*G01S 13/58* (2006.01)
*G01S 13/931* (2020.01)

(52) U.S. Cl.
CPC ............ *G01S 13/58* (2013.01); *G01S 13/931* (2013.01)

(58) Field of Classification Search
CPC ........ G01S 13/58; G01S 7/2921; G01S 17/86; G01S 17/894; G01S 7/354; G01S 15/931; G01S 13/343; G01S 13/862; G01S 13/865; G01S 17/931; G01S 2013/9323; G01S 2013/9324; G01S 2013/93271; G01S 2013/93272; G01S 2013/93274; G01S 13/584; G01S 13/931
See application file for complete search history.

(56) References Cited

U.S. PATENT DOCUMENTS

| 10,634,766 | B2 * | 4/2020 | Stachnik | G01S 13/931 |
| 11,047,974 | B1 * | 6/2021 | Hong | G01S 13/68 |
| 12,066,520 | B2 * | 8/2024 | Wu | G01S 13/582 |
| 2020/0209848 | A1 | 7/2020 | Mercep et al. | |
| 2020/0386883 | A1 * | 12/2020 | Hofmann | G01S 13/584 |
| 2021/0026006 | A1 | 1/2021 | Steiner et al. | |

FOREIGN PATENT DOCUMENTS

| CN | 104395774 B | 7/2017 |
| UA | 130173 U | 11/2018 |

OTHER PUBLICATIONS

Schmid et al., "Motion Compensation and Efficient Array Design for TDMA FMCW MIMO Radar Systems", 6th European Conference on Antennas and Propagation (EUCAP), Mar. 2012, pp. 1746-1750.

(Continued)

*Primary Examiner* — Vladimir Magloire
*Assistant Examiner* — Anna K. Gosling
(74) *Attorney, Agent, or Firm* — XSENSUS LLP

(57) ABSTRACT

The present disclosure provides a circuitry for radar detection data disambiguation for a mobile platform. The circuitry is configured to obtain radar detection data from a radar sensor mounted on the mobile platform, wherein the radar detection data indicate, for each of a plurality of targets, a radial velocity and an angle of arrival; estimate, based on the radar detection data, an ego-motion of the mobile platform; and determine an unambiguous radial velocity value of a target of the plurality of targets based on the ego-motion and the radar detection data.

20 Claims, 9 Drawing Sheets

(56) References Cited

OTHER PUBLICATIONS

Roos et al., "Enhancement of Doppler Unambiguity for Chirp-Sequence Modulated TDM-MIMO Radars," IEEE MTT-S International Conference on Microwaves for Intelligent Mobility (ICMIM), 2018, 4 pages.
Rohling, "Resolution of Range and Doppler Ambiguities in Pulse Radar Systems" AEG Aktiengesellschaft, Research Center, 5 pages.
Kellner et al., "Instantaneous Ego-Motion Estimation using Multiple Doppler Radars", Researchgate, Conference Paper, Available Online At: https://www.researchgate.net/publication/287218315, May 2015, 7 pages.
Thurn et al., "Concept and Implementation of a PLL-Controlled Interlaced Chirp Sequence Radar for Optimized Range-Doppler Measurements", IEEE Transactions on Microwave Theory and Techniques, vol. 64, No. 10, Oct. 2016, pp. 3280-3289.
Berthold et al., "Deriving Spatial Occupancy Evidence From Radar Detection Data", Researchgate, Conference Paper, Available Online At: https://www.researchgate.net/publication/344903868_Deriving_Spatial_Occupancy_Evidence_from_Radar_Detection_Data, Oct. 2020, 7 pages.
Gu et al., "High Speed Moving Target Detection Using Distributed OFDM-MIMO Phased Radar", IEEE, 12th International Conference on Signal Processing (ICSP), 2014, pp. 2087-2091.

\* cited by examiner

CIRCUITRY AND METHOD

CROSS-REFERENCE TO RELATED APPLICATION

The present application claims priority to European Patent Application No. 21210270.1, filed Nov. 24, 2021, the entire contents of which are incorporated herein by reference.

TECHNICAL FIELD

The present disclosure generally pertains to a circuitry and a method, and in particular to a circuitry and a method for radar detection data disambiguation for a mobile platform.

TECHNICAL BACKGROUND

Generally, it is known to provide radar sensors in a mobile platform.

Based on radar sensor detection data obtained from radar sensors of a mobile platform, an environment of the mobile platform can be sensed and an ego-motion of the mobile platform can be estimated.

It is also known that velocity values obtained from radar sensors may be ambiguous.

Although there exist techniques for disambiguation of velocity values obtained from radar sensors, it is generally desirable to improve a technique for radar detection data disambiguation for a mobile platform.

SUMMARY

According to a first aspect, the disclosure provides a circuitry for radar detection data disambiguation for a mobile platform, the circuitry being configured to obtain radar detection data from a radar sensor mounted on the mobile platform, wherein the radar detection data indicate, for each of a plurality of targets, a radial velocity and an angle of arrival; estimate, based on the radar detection data, an ego-motion of the mobile platform; and determine an unambiguous radial velocity value of a target of the plurality of targets based on the ego-motion and the radar detection data.

According to a second aspect, the disclosure provides a method for radar detection data disambiguation for a mobile platform, the method comprising obtaining radar detection data from a radar sensor mounted on the mobile platform, wherein the radar detection data indicate, for each of a plurality of targets, a radial velocity and an angle of arrival; estimating, based on the radar detection data, an ego-motion of the mobile platform; and determining an unambiguous radial velocity value of a target of the plurality of targets based on the ego-motion and the radar detection data.

Further aspects are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF EMBODIMENTS

Figure 8:
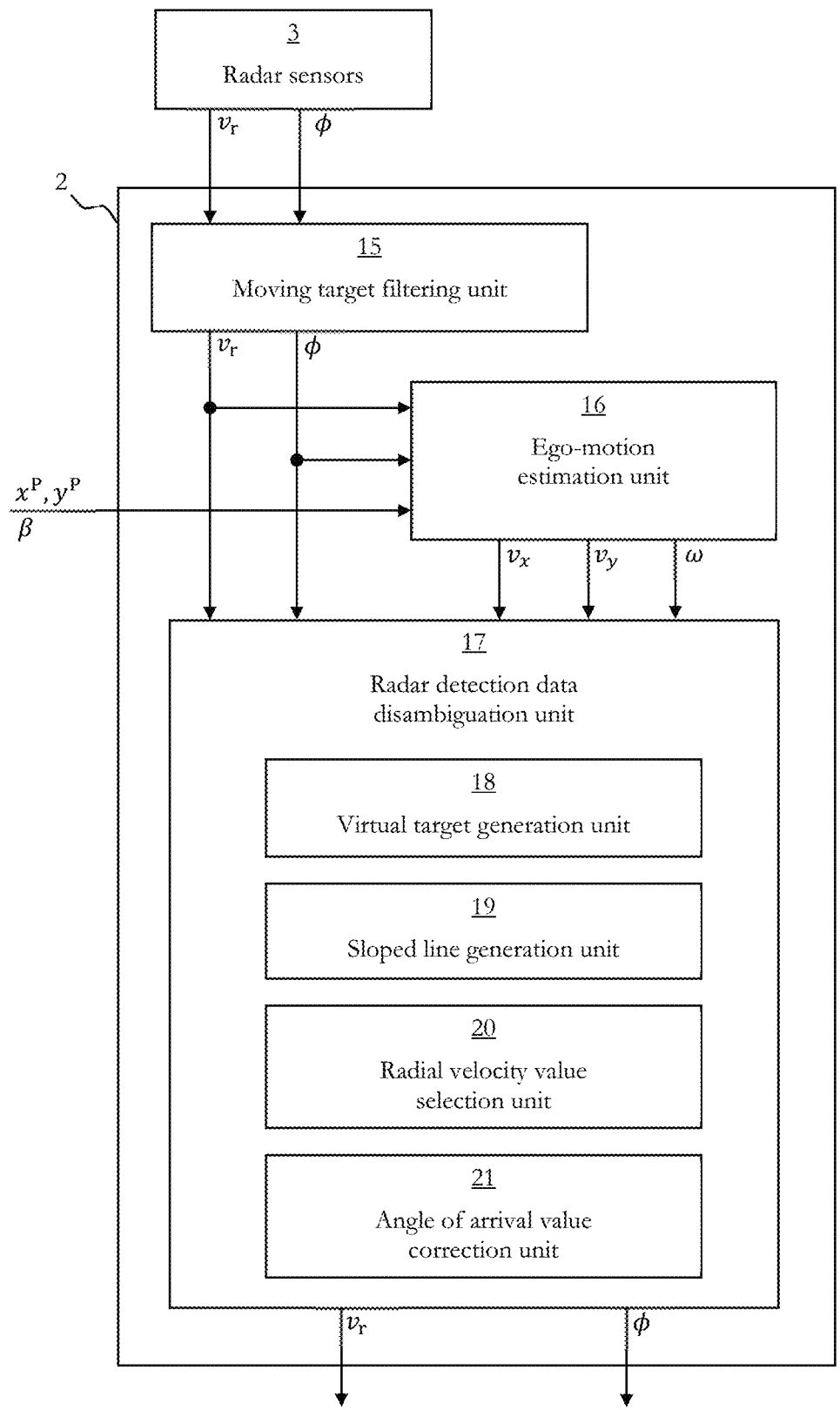
FIG. 8 is a block diagram illustrating a circuitry according to an embodiment of the present disclosure.

Before a detailed description of the embodiments under reference of FIG. 8 is given, general explanations are made.

As discussed in the outset, it is generally known to provide radar sensors in a mobile platform.

Based on radar sensor detection data obtained from radar sensors of a mobile platform, an environment of the mobile platform can be sensed and an ego-motion of the mobile platform can be estimated.

Autonomous driving, navigation and/or driver assistance systems may be based on information about the environment including, for example, obstacles, vehicles and pedestrians, and on the estimated ego-motion of the mobile platform.

It is also known that velocity values obtained from radar sensors may be ambiguous. For example, a radial velocity value, which indicates a relative velocity of a target to a radar sensor, may be detectable only within a velocity detection range of a radar sensor due to a Doppler shift of a radar signal received by the radar sensor.

The velocity detection range may depend on a limited maximum radial velocity that is unambiguously measurable by the radar sensor and may be predetermined by an operation mode of the radar sensor.

There are different approaches for radial velocity disambiguation.

For example, the purpose of resolving velocity ambiguities has been achieved on the basis of single targets and independently of other targets. There was no approach to resolve speed ambiguities by applying an ego-motion estimation approach.

One possible solution to resolve velocity ambiguities in general is tracking, and thus evaluating multiple frames but single targets. It could be shown that velocity ambiguities can be resolved with tracking.

Likewise, special alternating ramp variations may be used to resolve a velocity ambiguity.

Another possibility is a phase evaluation of overlapping Multiple-Input Multiple-Output (MIMO) antenna elements, since overlapping MIMO antenna elements typically should have identical relative angular phases regardless of a radial velocity. In addition, velocity ambiguities may also be reduced, but in some instances not resolved, by different multiplexing strategies, such as Code Division Multiplexing (CDM) or Frequency Division Multiplexing (FDM), but this may also entail an adjustment of the sensor configuration. Finally, there are also technologies to eliminate velocity ambiguities for a small velocity range by phase references.

Phase-based velocity disambiguation approaches are commonly used approaches since, with these approaches, typically, a small part of the ambiguous velocity can be resolved unambiguously without changing the sensor configuration and parameterization. In some instances, the limited resolving capability may be problematic, which may just regain the same unambiguous Doppler velocity as in the Single-Input Multiple-Output (SIMO) Time Division Multiplexing (TDM) case.

In addition, alternating sensor configurations are also currently used very frequently and resolved using the Chinese remainder theorem, which makes assertions about a solution of a simultaneous congruence system.

Generally, there exist also other possibilities to estimate an ego-motion without ambiguities, for example, by using other sensors like Global Positioning System (GPS), cameras, Light Detection and Ranging (LIDAR), an Inertial Mass Unit (IMU), and so on.

However, it has been recognized that such known solutions may not be applied to arbitrary radar systems but require a specific sensor configuration.

In some approaches, at least one virtual antenna element must be overlapping, which reduces the available antenna elements for angle estimation by one. Using such approaches, a higher unambiguously measurable radial velocity may be measured at the same production cost, but the result may be a worse angle estimation. It has also been recognized that in some instances special alternating ramps may be needed for resolving velocity ambiguities, since universal use may not be ensured in some cases.

Other multiplexing strategies compared to the conventional TDM strategy may increase in some instances the unambiguously measurable radial velocity, but may also degrade other radar detection parameters.

Another known approach for the detection of phase jumps, which may not have any restrictions regarding the multiplexing strategy, the sensor parameterization or the antenna configuration in some instances, may only increase the maximum unambiguous velocity of MIMO radar sensors by a factor of n, where n corresponds to the number of TDM-based transmitters, whereby the maximum unambiguous measurable radial speed may remain limited.

It has been recognized that previous approaches resolve velocity ambiguities for each target separately and do not use all targets at the same time.

However, it has been further recognized that using all targets at the same time may be possible in the case of stationary targets and a moving platform by applying an ego-motion estimation algorithm.

Accordingly, some embodiments provide a disambiguation of radial velocity components that are measured by a radar sensor. In some embodiments, it is based on an ego-motion estimation of a mobile platform that may be robust with respect to a maximum unambiguously measurable radial velocity and, thus, some embodiments may provide a high robustness against velocity ambiguities which occur in the field of radar sensor technology due to the limited maximum unambiguously measurable radial velocity.

Some embodiments are based on an algorithm which correctly estimates an ego-motion (three degrees of freedom) and, thus, resolves measured radial velocity ambiguities of stationary targets by using ambiguous radar measurements recorded with a cascadable radar sensor network mounted on a mobile platform. In some embodiments, this can be achieved without additional sensors like GPS, IMU, camera or LIDAR, and is therefore solely based on radar measurements.

For this purpose, the algorithm of some embodiments uses detected ambiguous radial velocities in combination with a motion model of a mobile platform, which may allow plausible radial velocity components to be distinguished from implausible radial velocity components.

Some embodiments provide a disambiguation of radial velocity components measured by a radar sensor. Some embodiments allow an ego-motion estimation of a mobile platform that is robust with respect to the maximum unambiguous measurable radial velocity and that is solely based on radar sensors mounted on a nonstationary mobile platform, without additional sensors.

In some embodiments, a disambiguation of measured radial velocities is solely based on radar sensor networks which are mounted on a non-stationary mobile platform and detect stationary targets in a channel. The network may include at least one imaging radar sensor and may be extended to multiple radar sensors.

The algorithm is used, in some embodiments, to resolve velocity ambiguities of stationary targets which occur when radial velocities between a non-stationary radar sensor and a stationary target are too high. For this purpose, possible ambiguous velocity components may be added to each target in a signal processing chain, which may increase a virtual number of targets in a channel. A subsequent ego-motion-based resolving of velocity ambiguities may allow the stationary targets to be assigned their real ambiguity-free radial velocity component.

For this, only an ego-motion of a mobile platform may need to be estimated, which can be done based on ambiguous velocity information, in some embodiments.

The resolving of velocity ambiguities may, thus, be completely independent of additional and external system sensors like GPS, IMU, camera or LIDAR, and may, therefore, be solely based on radar measurements.

In some embodiments, the algorithm allows resolving of velocity ambiguities in a radar sensor network during proper motion estimation without relying on special constraints. In some embodiments, it can be used independently of the of a radar type and radar parameterization. No special antenna elements or alternating ramp configurations may need to be designed for this purpose, which results in a wide range of applications without hardware limitations.

Furthermore, velocity ambiguities may be resolved without tracking and, thus, based on a current (single) measurement frame.

In some embodiments, a target list spanning method offers a possibility to significantly increase a robustness of velocity ambiguity resolution, which may allow accurate and robust self-motion estimation despite velocity ambiguities.

A number of radar sensors may also be cascaded and, thus, provide additional robustness.

Consequently, in view of the above, some embodiments of the present disclosure pertain to a circuitry for radar detection data disambiguation for a mobile platform, wherein the circuitry is configured to obtain radar detection data from a radar sensor mounted on the mobile platform, wherein the radar detection data indicate, for each of a plurality of targets, a radial velocity and an angle of arrival; estimate, based on the radar detection data, an ego-motion of the mobile platform; and determine an unambiguous radial velocity value of a target of the plurality of targets based on the ego-motion and the radar detection data.

The circuitry may include any entity capable of performing estimation calculations. For example, the circuit may include a central processing unit (CPU), a graphics processing unit (GPU), a complex instruction set computer (CISC), a reduced instruction set computer (RISC), a field-programmable gate array (FPGA) and/or an application-specific integrated circuit (ASIC).

The circuitry may be provided on the mobile platform. The circuitry may be provided separate from the mobile platform and may communicate with the mobile platform and/or with one or more radar sensors of the mobile platform via a wired or wireless connection. The mobile platform may be provided virtually only, for example in a software simulation, and the circuitry may perform data processing as part of or separate from the software simulation.

The mobile platform may be any platform that can be moved, for example a vehicle. Examples of a mobile platform include a car, a truck, an autonomous vehicle, a train, an Autonomous Mobile Robot (AMR), a tractor, an excavator, a bicycle, a motorcycle, a trike, a people mover, a watercraft, an airborne vehicle, a tracked vehicle, or the like.

The mobile platform may include one or more radar sensors. The one or more radar sensors may belong to a network of radar sensors. The radar sensor (or the radar sensors of the network of radar sensors) may be mounted on the mobile platform. A mounting position and a mounting angle of each radar sensor on the mobile platform may be predetermined. The radar sensors may be oriented along different directions. Some of the radar sensors may also be oriented along the same direction.

A radar sensor (or a plurality of radar sensors) of the mobile platform may include a Single-Input Multiple-Output (SIMO) radar sensor that has one transmission antenna and multiple reception antennae. A radar sensor (or a plurality of radar sensors) of the mobile platform may include a Multiple-Input Multiple-Output (MIMO) radar sensor that has multiple transmission antennae and multiple reception antennae.

Embodiments of the present disclosure may include a SIMO radar sensor and/or a MIMO radar sensor, using arbitrary multiplexing strategy, and an arbitrary number, position and configuration of the radar sensor(s).

The radar sensor (or plurality of radar sensors) may be configured according to any arbitrary multiplexing approach (multiplexing strategy), including Time Division Multiplexing (TDM), Frequency Division Multiplexing (FDM) and/or Code Division Multiplexing (CDM), for example.

A radar sensor (or a plurality of radar sensors) of the mobile platform may include a Doppler radar sensor capable of measuring a frequency shift between an emitted radar signal and a received radar signal, and determining a radial velocity, relative to the radar sensor, of a target from which the received radar signal is reflected. The radar sensor (or plurality of radar sensors) may also be capable of measuring an angle of arrival of the received radar signal reflected from the target.

The radar sensor (or plurality of radar sensors) may be capable of measuring a distance between the radar sensor and the target from which the received radar signal is reflected, in some embodiments.

A radial velocity, an angle of arrival and, in some embodiments, a distance may be determined by the radar sensor (or plurality of radar sensors) for any number of targets, for example for one target, for ten targets or for a hundred targets, without limiting the scope of the present disclosure thereto.

The radar sensor (or plurality of radar sensors) may acquire radar detection data, which may include, for each detected target, the radial velocity, the angle of arrival and, in some embodiments, the distance.

Figure 1:
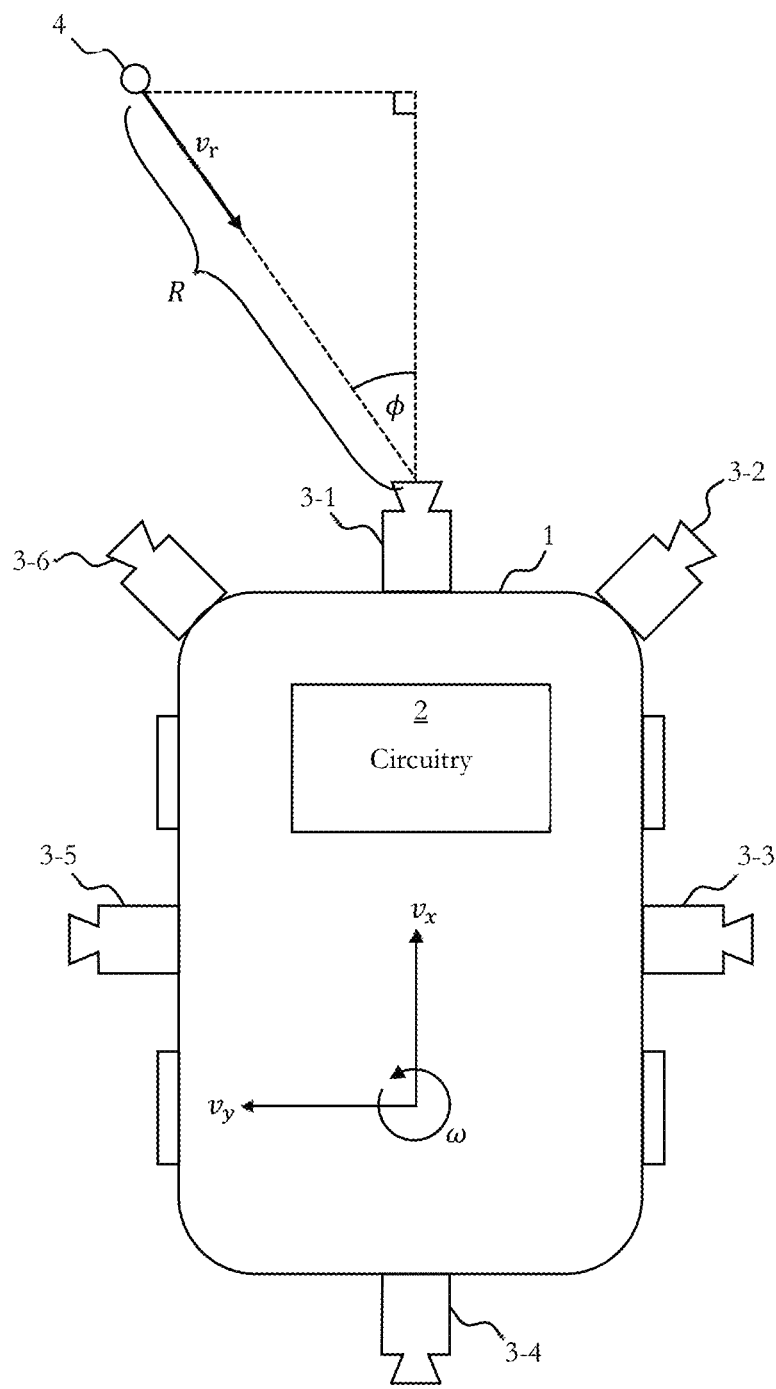
FIG. 1 is a block diagram of a vehicle according to an embodiment of the present disclosure.

FIG. 1 illustrates a vehicle 1, which is an example of a mobile platform. In the following, a relationship between variables used in the present description of embodiments is explained under reference of FIG. 1 (without limiting the present disclosure to the specific presentation and relationship of the variables).

The vehicle 1 includes a circuitry 2 in accordance with the present disclosure and radar sensors 3-1 to 3-6. Hereinafter, the radar sensors 3-1 to 3-6 are generally referred to as radar sensor(s) 3.

The vehicle 1 moves in an environment, for example on a road. The motion of the vehicle 1 is referred to as ego-motion and includes a longitudinal velocity $v_x$, which is a forward movement of the vehicle 1, a lateral velocity $v_y$, which is a sideways movement of the vehicle 1 orthogonal to the longitudinal velocity $v_x$, and a yaw rate $\omega$, which is a speed of rotation in the horizontal plane.

The motion model of the vehicle 1 is based on the assumption that the vehicle 1 is a road vehicle and its ego-motion can be approximated with components only in the horizontal plane. This motion model, however, is only provided as an example without limiting the scope of the present disclosure thereto. In some embodiments, additional and/or other motion components may be considered by the motion model. For example, in some embodiments, a motion model for a mobile platform may also consider a vertical velocity, a pitch rate and/or a roll rate.

The radar sensors 3 may detect targets. For example, as illustrated in FIG. 1, the radar sensor 3-1 may detect a target 4 and may acquire a radial velocity $v_r$ of the target 4 relative to the radar sensor 3-1, an angle of arrival $\phi$ between the radial velocity $v_r$ of the target 4 and the longitudinal velocity $v_x$ of the vehicle 1, and, in some embodiments, a distance R between the target 4 and the radar sensor 3-1.

Due to the radial velocity $v_r$ of the target 4, a frequency spectrum of a radar signal reflected from the target 4 and received by the radar sensor 3-1 may be Doppler shifted with respect to a frequency spectrum of a radar signal emitted by the radar sensor 3-1.

Figure 2:
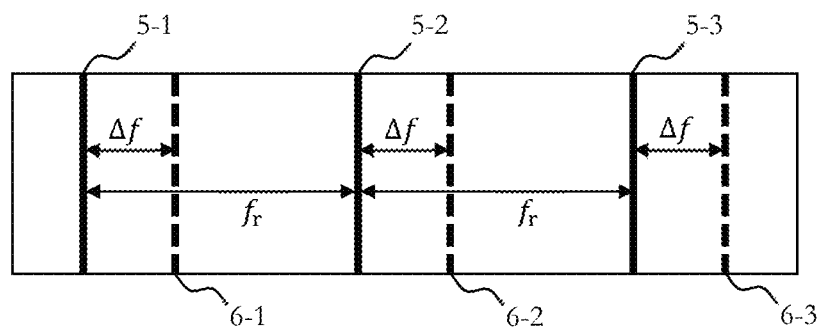
FIG. 2 is a diagram illustrating a Doppler shift of a radar frequency spectrum according to an embodiment of the present disclosure.

FIG. 2 shows a Doppler shift of a radar frequency spectrum for illustration purposes.

A frequency spectrum of a radar signal emitted by a radar sensor 3 includes, in some embodiments, equidistant frequency components 5-1 to 5-3, illustrated as solid lines, with a spacing that corresponds to a pulse repetition frequency $f_r$ of the radar signal.

Frequency components 6-1 to 6-3, illustrated as dashed lines, of a radar signal that has been reflected by the target 4 are shifted by a Doppler shift $\Delta f$ corresponding to the radial velocity $v_r$ of the target 4 relative to the radar sensor 3. For example, the frequency component 6-1 of the received radar signal is shifted by $\Delta f$ from the frequency component 5-1 of the emitted radar signal, the frequency component 6-2 of the received radar signal is shifted by $\Delta f$ from the frequency component 5-2 of the emitted radar signal, and the frequency component 6-3 of the received radar signal is shifted by $\Delta f$ from the frequency component 5-3 of the emitted radar signal. Thus, the radial velocity $v_r$ can be determined based on the Doppler shift $\Delta f$ of the received radar signal.

However, for a high radial velocity $v_r$ of the target 4, the Doppler shift $\Delta f$ may exceed the pulse repetition frequency $f_r$. Therefore, in some embodiments, it is not possible to determine unambiguously which frequency component 5-1 to 5-3 of an emitted radar signal corresponds to a frequency component 6-1 to 6-3 of a received radar signal.

Hence, in some embodiments, a measured value $v_{meas}$ of the radial velocity $v_r$ determined by the radar sensor 3 only corresponds to a relative position of the frequency components 6-1 to 6-3 of the received radar signal in a range between the respective two surrounding frequency components 5-1 to 5-3 of the emitted radar signal.

The range $f_r$ between consecutive frequency components 5-1 to 5-3 of the emitted radar signal corresponds to a velocity value $v_{max}$, which is given by:

$$v_{max} = \frac{c_0 f_r}{4 f_c} = \frac{c_0}{4 f_c T_r} \tag{1}$$

Here, $c_0$ is the speed of light, $T_r = f_r^{-1}$ is the pulse repetition period of the radar signal (or, for example, the time between two consecutive frequency ramps transmitted by the same antenna of a chirp sequence radar sensor), and $f_c$ is the center frequency of the emitted radar signal (for example, a chirp sequence radar signal).

Thus, in some embodiments, a measured value $v_{meas}$ of the radial velocity between the target 4 and the radar sensor 3 is acquired according to equation (2), and may differ from a theoretical (true) value $v_{theo}$ of the radial velocity between the target 4 and the radar sensor 3:

$$v_{meas} = \mathrm{mod}(v_{theo} + v_{max}, 2v_{max}) - v_{max} \tag{2}$$

Therefore, in some embodiments, a measured value $v_{meas}$ of the radial velocity is always included in the interval from $-v_{max}$ to $v_{max}$, which is a velocity detection range of the radar sensor 3, independent of the real theoretical value $v_{theo}$ of the radial velocity.

If a theoretical (true) radial velocity value $v_{theo}$ is included in the velocity detection range of the radar sensor 3, the measured value $v_{meas}$ equals the true value $v_{theo}$, which means that the radial velocity is measured unambiguously. However, if a theoretical (true) radial velocity value $v_{theo}$ is not included in the velocity detection range of the radar sensor 3 (i.e. $v_{theo} > v_{max}$ or $v_{theo} < -v_{max}$), the measured value $v_{meas}$ is mapped into the velocity detection range of the radar sensor 3 from $-v_{max}$ to $v_{max}$ according to equation (2), which means that the radial velocity is not determined unambiguously.

Accordingly, in some embodiments, an ambiguity-free measurable value of a radial velocity is limited to $\pm v_{max}$, as defined in equation (1). An interval from $-v_{max}$ to $v_{max}$ is hereinafter referred to as velocity detection range (of a radar sensor).

For a target with a radial velocity exceeding this limit, the measured radial velocity value and, as described in the following, in some embodiments, also the measured value of the angle of arrival may be incorrect.

An angle estimation of radar sensors, for example an estimation of an angle of arrival $\phi$ of a radar signal, may depend on a path difference between two antenna elements of a radar sensor.

Figure 3:
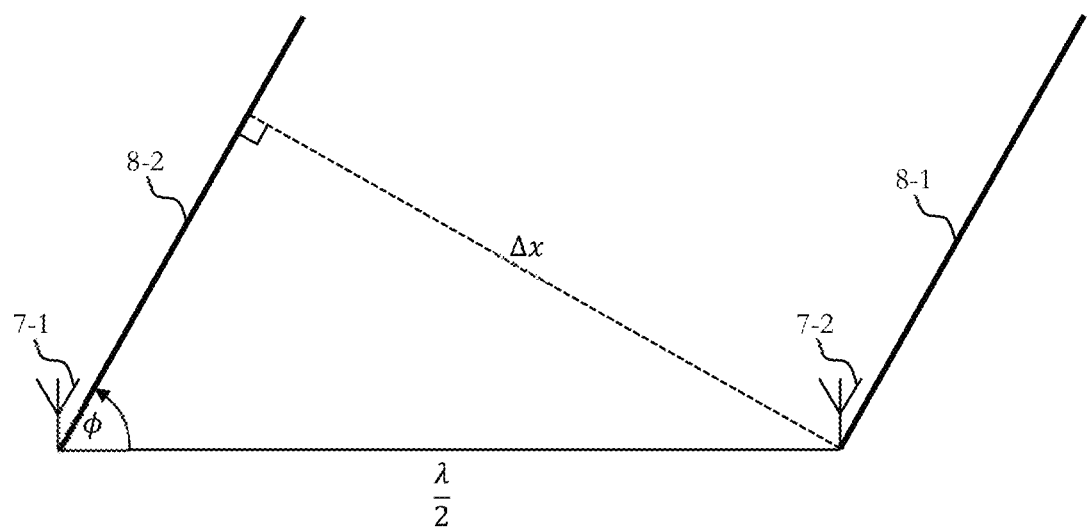
FIG. 3 is a diagram illustrating reception antennae according to an embodiment of the present disclosure.

FIG. 3 illustrates an embodiment of two reception antennae 7-1 and 7-2 of a SIMO (Single-Input Multiple-Output) or MIMO (Multiple-Input Multiple-Output) radar sensor with two incoming wave fronts 8-1 and 8-2 of a reflected radar signal that is received by the antennae 7-1 and 7-2. The antennae 7-1 and 7-2 are arranged with a $$\frac{\lambda}{2}$$

spacing, i.e. a distance between the antennae 7-1 and 7-2 corresponds to a half wavelength of the radar signal. A path difference between the incoming wavefronts 8-1 and 8-2 is $\Delta x$.

The embodiment of FIG. 3 is only an arbitrary example and is not meant to limit the scope of the present disclosure to this specific embodiment. An antenna configuration of a radar sensor may be completely independent of the approach of FIG. 3.

A correlation between a searched angle of arrival $\phi$ of the incoming wave fronts 8-1 and 8-2, the distance $$\frac{\lambda}{2}$$

between the antennae 7-1 and 7-2 and the path difference $\Delta x$ between the incoming wavefronts 8-1 and 8-2 is given by equation (3):

$$2\pi \frac{\Delta x}{\lambda} = \Delta \varphi = \pi \sin(\phi) \tag{3}$$

Here, $\Delta \varphi$ is a phase difference between the antennae 7-1 and 7-2 of the incoming wavefronts 8-1 and 8-2.

In some embodiments, e.g. that pertain to SIMO radar sensors, which have only one transmission antenna, a measured value of the angle of arrival $\phi$ corresponds to the true value.

However, in some embodiments, e.g. that pertain to Time Division Multiplexing (TDM) operated MIMO radar sensors, which have multiple transmission antennae, a measured value of the angle of arrival $\phi$ may not correspond to the true value if the true radial velocity value $v_{theo}$ differs from the measured radial velocity value $v_{meas}$, and a path difference $\Delta s$ may need to be added twice to compensate for a movement between a joint angle estimation of all antennae. Based on this additional path/phase, different values of an angle of arrival $\phi$ may be detected.

The path difference $\Delta s$ may be:

$$\Delta s = \frac{v_r T_r 2\pi}{\lambda} \tag{4}$$

Accordingly, the path difference $\Delta x^{MIMO}$ of incoming wavefronts 7-1 and 7-2 detected by a TDM-operated MIMO radar sensor may be given as:

$$\Delta x^{MIMO} = \Delta x + 2\Delta s \tag{5}$$

Hence, for MIMO radar sensors, the path difference $\Delta x^{MIMO}$ between incoming wavefronts 7-1 and 7-2 and, hence, also the measured value of the angle of arrival $\phi$, may depend on the radial velocity $v_r$ of the target 4.

Therefore, depending on the multiplexing strategy, the measured value of the angle of arrival $\phi$ may or may not depend on the radial velocity $v_r$ of the target 4.

The circuitry 2 may obtain the radar detection data, in which values of a radial velocity and of an angle of arrival may be ambiguous. The circuitry 2 may estimate, based on the radar detection data obtained from the radar sensor (or plurality of radar sensors), an ego-motion of the mobile platform.

In the following, an example of an ego-motion estimation is described under reference of FIG. 4.

Figure 4:
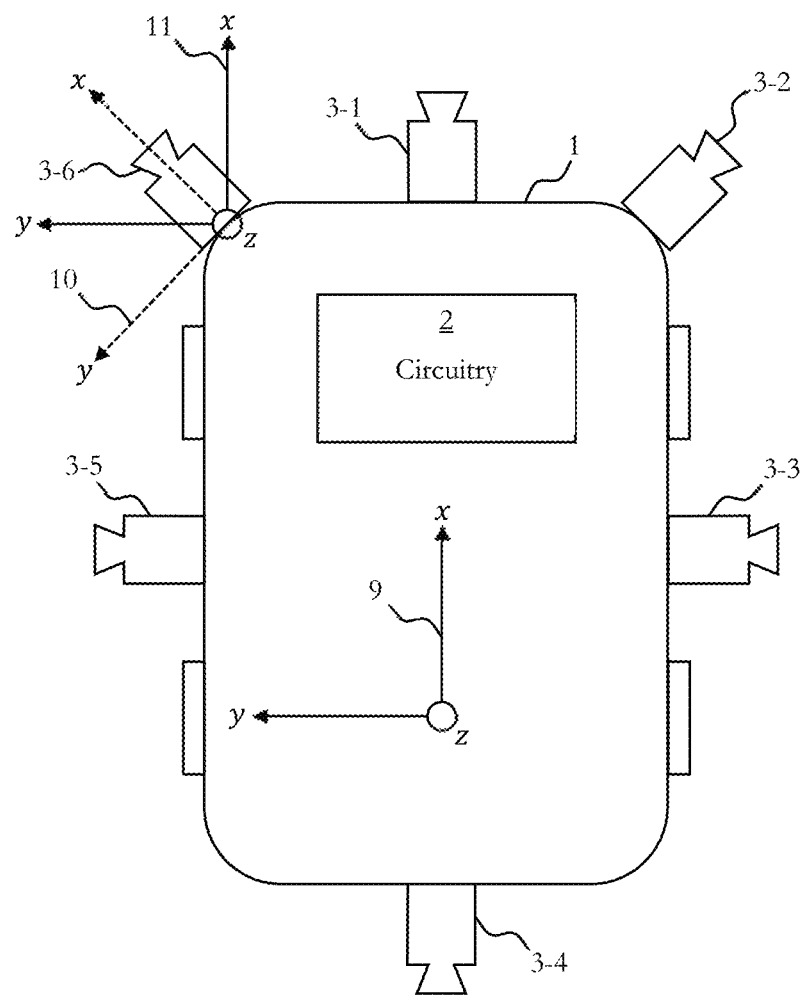
FIG. 4 is a diagram illustrating coordinate systems in a mobile platform according to an embodiment of the present disclosure.

FIG. 4 illustrates coordinate systems involved in ego-motion estimation of the vehicle 1.

The vehicle 1 has a vehicle coordinate system 9, which corresponds to a rest frame of the vehicle 1, without limiting the scope of the present disclosure in that regard. An x-axis of the vehicle coordinate system 9 points in a longitudinal driving direction of the vehicle 1 and is oriented parallel to the longitudinal velocity $v_x$ of the vehicle 1. A y-axis of the vehicle coordinate system 9 points to a left side of the vehicle 1 and is oriented parallel to the lateral velocity $v_y$ of the vehicle 1. A z-axis of the vehicle coordinate system 9 points upwards and is the axis around which the vehicle 1 rotates with the yaw rate $\omega$. In some embodiments, the origin of the vehicle coordinate system 9 is located at the center of a rear axis of the vehicle 1.

Each of the radar sensors 3 has a sensor coordinate system 10, as illustrated for the radar sensor 3-6 with dashed lines. The sensor coordinate system 10 corresponds to a rest frame of the respective radar sensor 3. An x-axis of the sensor coordinate system 10 points in a central direction of a field of view of the respective radar sensor 3. A y-axis of the sensor coordinate system 10 points to a left direction with respect to the x-axis of the sensor coordinate system 10. A z-axis of the sensor coordinate system 10 points upwards and, thus, is parallel to the z-axis of the vehicle coordinate system 9. The origin of the sensor coordinate system 10 is located at a mounting position of the respective radar sensor 3, i.e. a position of the vehicle 1 at which the respective radar sensor 3 is mounted. Hence, the sensor coordinate system 10 is rotated against the vehicle coordinate system 9 along a vertical axis by a mounting angle of the respective radar sensor 3.

Additionally, each of the radar sensors 3 has an aligned coordinate system 11, as illustrated for the radar sensor 3-6 with solid lines. The aligned coordinate system 11 also corresponds to a rest frame of the respective radar sensor 3 but is rotated with respect to the sensor coordinate system 10 to match an orientation of the vehicle coordinate system 9. Accordingly, an x-axis of the aligned coordinate system 11 is parallel to the x-axis of the vehicle coordinate system 9 and, thus, points in a longitudinal driving direction of the vehicle 1. A y-axis of the aligned coordinate system 11 is parallel to the y-axis of the vehicle coordinate system 9 and, thus, points to a left side of the vehicle 1. A z-axis of the aligned coordinate system 11 coincides with the z-axis of the sensor coordinate system 10, is parallel to the z-axis of the vehicle coordinate system 9 and, thus, points upwards. The origin of the aligned coordinate system 11 coincides with the origin of the sensor coordinate system 10 of the respective radar sensor 3 and, thus, is located at the mounting position of the respective radar sensor 3 on the vehicle 1.

The radar sensors 3 may be mounted at different positions of the vehicle 1 and may be oriented in different directions, i.e. the radar sensors 3 may have different mounting orientations. The mounting angles corresponding to the mounting orientations of the radar sensors 3 may be yaw angles, i.e. angles around the z-axis of the vehicle coordinate system 9. The central axes of the radar sensors 3 lie, without limiting the scope of the present disclosure, in the horizontal plane of the vehicle coordinate system 9, i.e. the plane spanned by the x-axis and the y-axis of the vehicle coordinate system 9.

The radar sensors 3 acquire, for each target, a radial velocity and an azimuth angle.

The idea behind the approach for Doppler radar ego-motion estimation is that ego-motion characteristics of an ego-vehicle, e.g. the vehicle 1, can be inferred by estimating relative velocities of static objects (i.e. targets) in a scene, assuming that the static targets in the scene can be distinguished from moving targets in the scene, given that the static targets form a biggest group following a consistent velocity profile among all detected targets in the scene.

A standard ego-motion estimation including a Random Sample Consensus (RANSAC) algorithm may be applied to estimate a most probable motion of the mobile platform (e.g. the vehicle 1) as ego-motion.

The ego-motion estimation is based on formulating a linear system of equations that establishes a relation between measured variables (including radial velocities and azimuth angles of detected targets) and ego-motion variables (including a longitudinal velocity and a yaw rate of the vehicle 1).

In the following, a relationship between the different variables in the linear system of equations is explained on a general level under reference of FIG. 4.

A velocity of the j-th radar sensor 3 of the radar sensors 3 with respect to a ground fixed coordinate frame (e.g. a road on which the vehicle 1 is driving or an environment of the vehicle 1 in which the vehicle 1 is moving) in the sensor coordinate system 9 of the respective radar sensor 3 is denoted as $v^{SCS_j}$ and includes a component v direction of the x-axis and a component $v_y^{SCS_j}$ in direction in of the y-axis of the corresponding sensor coordinate system 10:

$$v^{SCS_j} = \begin{bmatrix} v_x^{SCS_j} \\ v_y^{SCS_j} \end{bmatrix} \qquad (6)$$

The velocity $v^{SCS_j}$ of the j-th radar sensor 3 is estimated based on the radar detection data and, more specifically, based on the targets obtained from the j-th radar sensor 3. The j-th radar sensor 4 detects $N_j$ static targets and acquires for each of the $N_j$ static targets a radial velocity and an azimuth angle. Hereinafter, the term "target" is used to refer to static targets, unless noted otherwise. The radar detection data associate the k-th target of the $N_1$ static targets with a radial velocity $v_{j,k}^D$ and an azimuth angle $\theta_{j,k}^D$. The radial velocity $v_{j,k}^D$ is a relative velocity between the j-th radar sensor 3 and the k-th target, i.e. a rate of change of the Euclidean distance between the j-th radar sensor 3 and the k-th target. A length of the radial velocity $v_{j,k}^D$ vector corresponds to a value of the radial velocity $v_r$ illustrated in FIG. 1. The azimuth angle $\theta_{j,k}^D$ is an angle under which the j-th radar sensor 3 receives a radar signal reflected by the k-th target, i.e. an angle between the x-axis of the sensor coordinate system 10 of the j-th radar sensor 3 and the direction of arrival of the radar signal reflected by the k-th target. The azimuth angle $\theta_{j,k}^D$ differs from the angle of arrival $\phi$ illustrated in FIG. 1 in that the azimuth angle $\theta_{j,k}^D$ is an angle relative to the x-axis of the sensor coordinate system 10 of the j-th radar sensor 3 whereas the angle of arrival $\phi$ is an angle relative to the longitudinal velocity $v_x$ of the vehicle 1.

A relation between the velocity $v^{SCS_j}$ of the j-th radar sensor 3 and the targets it detects can be constructed according to the linear equation system (7):

$$\begin{bmatrix} -v_{j,1}^D \\ -v_{j,2}^D \\ \vdots \\ -v_{j,N_j}^D \end{bmatrix} = \begin{bmatrix} \cos(\theta_{j,1}^D) & \sin(\theta_{j,1}^D) \\ \cos(\theta_{j,2}^D) & \cos(\theta_{j,2}^D) \\ \vdots & \vdots \\ \cos(\theta_{j,N_j}^D) & \cos(\theta_{j,N_j}^D) \end{bmatrix} \begin{bmatrix} v_x^{SCS_j} \\ v_y^{SCS_j} \end{bmatrix} \quad (7)$$

The velocity vector $v^{SCS_j}$ of the j-th radar sensor 3 can be transformed to the aligned coordinate system 11 of the j-th radar sensor 3, which is aligned with the driving direction but located at the position of the j-th radar sensor 3, i.e. the aligned coordinate system 11 of the j-th radar sensor 3 corresponds to the sensor coordinate system 10 of the j-th radar sensor 3 rotated around its z-axis by an angle $\beta_j$ so that the x-axis and y-axis of the aligned coordinate system 11 are parallel to the x-axis and y-axis of the vehicle coordinate system 9, respectively.

The velocity vector $v^{ACS_j}$ of the j-th radar sensor 3 in the aligned coordinate system 11 of the j-th radar sensor 3 includes a component $v_x^{ACS_j}$ in direction of the x-axis and a component $v_y^{ACS_j}$ in direction of the y-axis of the corresponding aligned coordinate system 11:

$$v^{ACS_j} = \begin{bmatrix} v_x^{ACS_j} \\ v_y^{ACS_j} \end{bmatrix} \quad (8)$$

Accordingly, a relation between the velocity vector $v^{ACS_j}$ of the j-th radar sensor 3 in the aligned coordinate system 11 of the j-th radar sensor 3 and the velocity vector $v^{SCS_j}$ of the j-th radar sensor 3 in the sensor coordinate system 10 of the j-th radar sensor 3 is given in equation (9):

$$\begin{bmatrix} v_x^{SCS_j} \\ v_y^{SCS_j} \end{bmatrix} = \begin{bmatrix} \cos(\beta_j) & \sin(\beta_j) \\ -\sin(\beta_j) & \cos(\beta_j) \end{bmatrix} \begin{bmatrix} v_x^{ACS_j} \\ v_y^{ACS_j} \end{bmatrix} \quad (9)$$

Here, $\beta_j$ is the mounting angle (yaw angle) of the j-th radar sensor 3 in the vehicle 1. Basically, in equation (9) only a rotation matrix based on the mounting angle $\beta_j$ of the j-th radar sensor 3 is applied to establish a relation between the velocity vector $v^{ACS_j}$ and the velocity vector $v^{SCS_j}$.

A velocity vector $v^{VCS}$ of the vehicle coordinate system 9 (and, thus, of the vehicle 1) includes a yaw rate $\omega_z^{VCS}$ of the vehicle 1, a longitudinal velocity (forward speed) $v_x^{VCS}$ of the vehicle 1 and a lateral velocity $v_y$ of the vehicle 1:

$$v^{VCS} = \begin{bmatrix} \omega_z^{VCS} \\ v_x^{VCS} \\ v_y^{VCS} \end{bmatrix} \quad (10)$$

The yaw rate $\omega_z^{VCS}$ of the vehicle 1 corresponds to the yaw rate $\omega$ illustrated in FIG. 1, the longitudinal velocity (forward speed) $v_x^{VCS}$ of the vehicle 1 corresponds to the longitudinal velocity $v_x$ illustrated in FIG. 1, and the lateral velocity (sideward speed) $v_y^{VCS}$ of the vehicle 1 corresponds to the lateral velocity $v_y$ illustrated in FIG. 1.

In some embodiments, the vehicle coordinate system 9 is selected to have its origin at the center of the rear axle of the vehicle 1, without limiting the scope of the present disclosure thereto.

Notice that the j index does not appear in the $\omega_z^{VCS}$, the $v_x^{VCS}$ and the $v_y^{VCS}$ because these variables are not linked to a particular radar sensor 3 but to the vehicle 1.

A velocity vector $v^{VCS}$ of the vehicle coordinate system 9 can be estimated by applying the transformation of equation (11) to $v^{ACS_j}$:

$$\begin{bmatrix} v_x^{ACS_j} \\ v_y^{ACS_j} \end{bmatrix} = \begin{bmatrix} -y_j^P & 1 & 0 \\ x_j^P & 0 & 1 \end{bmatrix} \begin{bmatrix} \omega_z^{VCS} \\ v_x^{VCS} \\ v_y^{VCS} \end{bmatrix} \quad (11)$$

Here, $x_j^P$ is a component in direction of the x-axis and $y_j^P$ is a component in direction of the y-axis of the mounting position of the j-th radar sensor 3 in the vehicle coordinate system 9. By combining the equations (7), (9) and (11), the final system of equations for calculating the ego-motion of the vehicle 1 based on the sensor detection data can be constructed as:

$$\begin{bmatrix} -v_{j,1}^D \\ -v_{j,2}^D \\ \vdots \\ -v_{j,N_j}^D \end{bmatrix} = \begin{bmatrix} \cos(\theta_{j,1}^D) & \sin(\theta_{j,1}^D) \\ \cos(\theta_{j,2}^D) & \cos(\theta_{j,2}^D) \\ \vdots & \vdots \\ \cos(\theta_{j,N_j}^D) & \cos(\theta_{j,N_j}^D) \end{bmatrix} \begin{bmatrix} \cos(\beta_j) & \sin(\beta_j) \\ -\sin(\beta_j) & \cos(\beta_j) \end{bmatrix} \begin{bmatrix} -y_j^P & 1 & 0 \\ x_j^P & 0 & 1 \end{bmatrix} \begin{bmatrix} \omega_z^{VCS} \\ v_x^{VCS} \\ v_y^{VCS} \end{bmatrix} \quad (12)$$

With the definitions that $$v_j^D = \begin{bmatrix} -v_{j,1}^D \\ -v_{j,2}^D \\ \vdots \\ -v_{j,N_j}^D \end{bmatrix}, \quad (13.1)$$

$$Q_j^D = \begin{bmatrix} \cos(\theta_{j,1}^D) & \sin(\theta_{j,1}^D) \\ \cos(\theta_{j,2}^D) & \cos(\theta_{j,2}^D) \\ \vdots & \vdots \\ \cos(\theta_{j,N_j}^D) & \cos(\theta_{j,N_j}^D) \end{bmatrix}, \quad (13.2)$$

$$\text{Rot}(\beta_j) = \begin{bmatrix} \cos(\beta_j) & \sin(\beta_j) \\ -\sin(\beta_j) & \cos(\beta_j) \end{bmatrix}, \quad (13.3)$$

$$S_j = \begin{bmatrix} -y_j^P & 1 & 0 \\ x_j^P & 0 & 1 \end{bmatrix} \quad (13.4)$$

and $$R_j = Q_j^D \text{Rot}(\beta_j) S_j, \quad (13.5)$$

equation (12) can be rewritten as:

$$v_j^D = Q_j^D \text{Rot}(\beta_j) S_j \begin{bmatrix} \omega_z^{VCS} \\ v_x^{VCS} \\ v_y^{VCS} \end{bmatrix} = R_j \begin{bmatrix} \omega_z^{VCS} \\ v_x^{VCS} \\ v_y^{VCS} \end{bmatrix} \quad (14)$$

The equations (12) and (14) are defined for the j-th radar sensor 3 only. If a plurality of radar sensors 3 are mounted on the ego-platform, i.e. the vehicle 1, the individual set of equations for each radar sensor 3 can be considered together for estimating the ego-motion variables ($\omega_z^{VCS}$, $v_x^{VCS}$ and $v_y^{VCS}$):

$$\begin{bmatrix} v_1^D \\ v_1^D \\ \vdots \\ v_M^D \end{bmatrix} = \begin{bmatrix} R_1 \\ R_2 \\ \vdots \\ R_M \end{bmatrix} \begin{bmatrix} \omega_z^{VCS} \\ v_x^{VCS} \\ v_y^{VCS} \end{bmatrix} \quad (15)$$

Here, M is the number of radar sensors 3 mounted on the vehicle 1, i.e. on the ego-vehicle. In the embodiment of FIG. 1 and FIG. 4, for example, M=6.

With the final set of equations (15), the ego-motion variables can be estimated by solving the linear regression problem of (15).

In some embodiments, the data points, i.e. the detected targets and their associated radial velocities and azimuth angles, may contain many outliers due to the presence of moving targets. Therefore, it may be advantageous to use a Random Sampling Consensus (RANSAC) algorithm for solving the linear regression problem of (15) to filter out and ignore any moving targets indicated by the radar detection data.

Based on equation (15), an ego-motion of the vehicle 1 may be estimated. In addition to the radar detection data, the ego-motion estimation may be based on the mounting positions, for example including the x-components $x_j^P$ and the y-components $y_j^P$, of the radar sensors 3 and the mounting angles $\beta_j$ of the radar sensors 3. The mounting positions, for example including the x-components $x_j^P$ and the y-components $y_j^P$, of the radar sensors 3 and the mounting angles $\beta_j$ of the radar sensors 3 may be predetermined, for example.

For the ego-motion estimation of the vehicle 1, ambiguous velocity information, i.e. the measured velocity values $v_{meas}$ instead of the (true) theoretical values $v_{theo}$, may be used.

The circuitry 2 may determine an unambiguous radial velocity value of the target 4 based on the radar detection data and on the estimated ego-motion of the mobile platform (e.g. the vehicle 1).

The circuitry may determine an unambiguous radial velocity value, i.e. a true velocity value that may or may not equal the measured radial velocity value and that may or may not be included in a velocity detection range of the radar sensor, of one or more targets of a plurality of targets based on the ego-motion of the mobile platform and the radar detection data obtained from the radar sensor.

If the mobile platform includes a plurality of radar sensors, the plurality of targets may include targets detected by any of the radar sensors.

In some embodiments, the determining of an unambiguous radial velocity value of a target is based on determining a radial velocity value that is consistent with the ego-motion of the mobile platform from a set of radial velocity values for the target that differ from each other by a multiple of a velocity detection range of the radar sensor. For example, the set of radial velocity values may include values arranged in an equidistant spacing that corresponds to a length of the velocity detection range of the radar sensor.

A radial velocity value may be consistent with the ego-motion of the mobile platform if its deviation from a radial velocity value predicted by the ego-motion model is smaller than a deviation of any other radial velocity value corresponding to the measured radial velocity value of the corresponding target (for example, the measured radial velocity value itself, or a value shifted from the measured radial velocity value by a multiple of the velocity detection range of the radar sensor). For example, a radial velocity value may be consistent with the ego-motion of the mobile platform if its deviation from the radial velocity value predicted by the ego-motion model is smaller than a half length of the velocity detection range of the radar sensor.

The determining of the unambiguous radial velocity value of a target may be based on the assumption that the target is a stationary target, i.e. a target that does not move with respect to the environment of the mobile platform.

In some embodiments, the determining of the unambiguous radial velocity value of the target includes generating, based on the radar detection data and the ego-motion of the mobile platform, at least one additional radial velocity value by shifting a radial velocity value indicated by the radar detection data by a multiple of the velocity detection range of the radar sensor; determining radial velocity values that are consistent with the ego-motion of the mobile platform among radial velocity values indicated by the radar detection data and the at least one additional radial velocity value; and determining, as the unambiguous radial velocity value of the target, a radial velocity value corresponding to the target from the determined radial velocity values that are consistent with the ego-motion of the mobile platform.

For example, the circuitry may generate, for one or more targets of the plurality of targets, one or more radial velocity values from the set of radial velocity values differing from each other by a multiple of the velocity detection range of the radar sensor.

Figure 5:
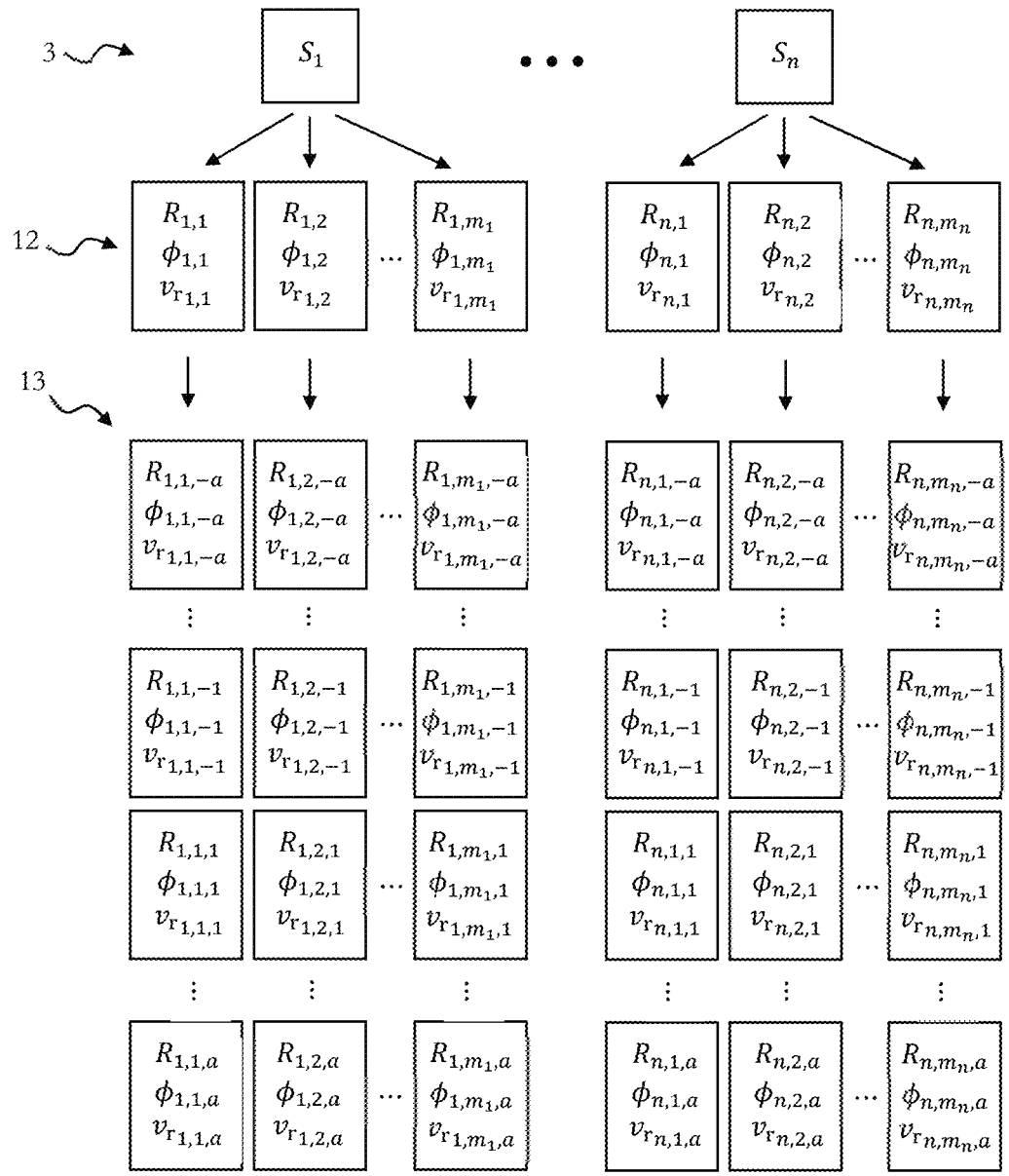
FIG. 5 is a block diagram illustrating a generation of additional values based on measured values according to an embodiment of the present disclosure.

FIG. 5 illustrates in a block diagram measured values 12 acquired by n radar sensors 3 and additional values 13 generated by the circuitry for determining unambiguous radial velocity values.

The n radar sensors 3 are labelled as $S_i$, with i=1, ..., n. The i-th radar sensor $S_i$ detects $m_i$ targets and acquires for the j-th detected target a set of measured values 12 including a value of a distance $R_{i,j}$ between the j-th target and the i-th radar sensor, a value of an angle of arrival $\phi_{i,j}$ of the radar signal reflected from the j-th target, and a value of a radial velocity $v_{r_{i,j}}$ of the j-th target with respect to the i-th radar sensor.

Each radar sensor $S_i$ may detect, for an arbitrary target j in a channel, a distance value $R_{i,j}$, a radial velocity value $v_{r_{i,j}}$ and a value of an angle of arrival $\phi_{i,j}$. These values may be saved in a target list associated with the radar sensor $S_i$, as indicated by the index i.

A signal processing step to determine value of the distance values $R_{i,j}$ and the radial velocity values $v_{r_{i,j}}$ of the targets may include a conventional two-dimensional (2D) Fast Fourier Transform (FFT) approach. The value of the angle of arrival $\phi_{i,j}$ may be determined by an appropriate but arbitrary angle estimator.

Based on the measured values 12, additional values 13 are generated. For example, for each target j, $2a$ sets of additional values 13 may be generated (a represents the number of ambiguities). The k-th set of additional values 13 corresponding to the j-th target detected by the i-th radar sensor includes a value of a distance $R_{i,j,k}$ between the j-th target and the i-th radar sensor, a value of an angle of arrival $\phi_{i,j,k}$ of the radar signal reflected from the j-th target, and a value of a radial velocity $v_{r_{i,j,k}}$ of the j-th target with respect to the i-th radar sensor.

The additional distance values $R_{i,j,k}$ may equal the corresponding measured distance value $R_{i,j}$ in some embodiments. Depending on the configuration of the radar sensors 3 (SIMO, MIMO, multiplexing strategy), the additional values of an angle of arrival $\phi_{i,j,k}$ may equal the corresponding measured value of the angle of arrival $\phi_{i,j}$ or may be calculated based on the measured value of the angle of arrival $\phi_{i,j}$, for example based on equation (5). The latter case show exemplarily the triangles in FIGS. 6 and 7, which will be described later in more detail. Each additional radial velocity value $v_{r_{i,j,k}}$ may differ from the corresponding measured radial velocity value $v_{r_{i,j}}$ by a multiple of a velocity detection range of the i-th radar sensor.

However, FIG. 5 is only provided as an example and does not limit the scope of the present disclosure thereto. For example, instead of generating 2a sets of additional values 13 for each radar sensor 3, a different number of sets of additional values 13 may be generated for different radar sensors 13. For example, no additional distance values $R_{i,j,k}$ may be generated, or measured distance values $R_{i,j}$ may not be acquired at all.

Figure 6:
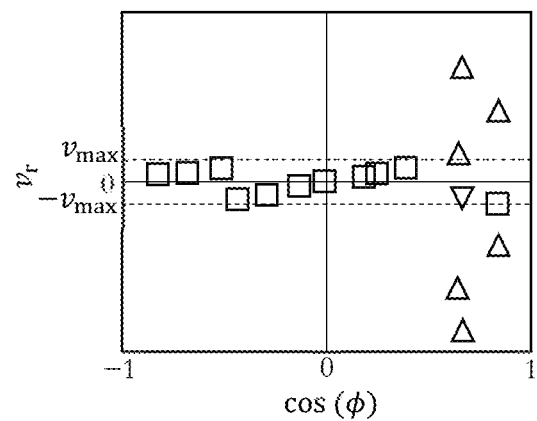
FIG. 6 is a diagram illustrating values included in exemplary radar detection data according to an embodiment of the present disclosure.
Figure 7:
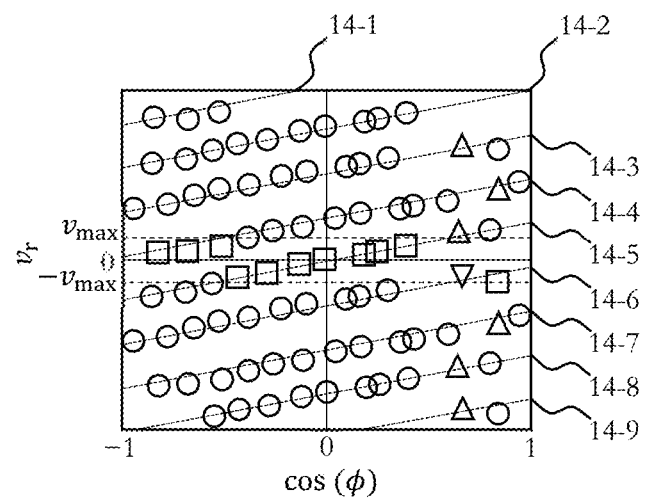
FIG. 7 is a diagram illustrating virtual targets generated according to an embodiment of the present disclosure.

FIG. 6 and FIG. 7 illustrate generating additional values corresponding to virtual targets for velocity disambiguation.

FIG. 6 shows a diagram of values included in exemplary radar detection data. The values include for each of a plurality of targets a value pair including a measured value of a radial velocity $v_r$ and a measured value of an angle of arrival $\phi$. The abscissa of the diagram shows the cosine cos ($\phi$) of the value of the angle of arrival $\phi$, ranging from −1 to 1, and the ordinate of the diagram shows the value of the radial velocity $v_r$. Dashed horizontal lines indicate the velocity detection range of the radar sensor(s), ranging from −$v_{max}$ to $v_{max}$.

Each square in the diagram represents one detected target with the measured value of its radial velocity $v_r$ and the cosine cos ($\phi$) of the measured value of its angle of arrival $\phi$. As can be seen, the measured radial velocity values lie within the velocity detection range of the radar sensor(s).

The triangle pointing down represents another detected target such as the targets represented by squares, including the measured value of its radial velocity $v_r$ and the cosine cos ($\phi$) of the measured value of its angle of arrival $\phi$. However, the target represented by the triangle pointing down illustrates the generation of additional values of the radial velocity $v_r$ and of the (cosine of the) angle of arrival $\phi$.

The triangles pointing up indicate the additional values. The additional radial velocity values are generated by shifting the measured radial velocity value, indicated by the triangle pointing down, by multiples of the velocity detection range. The additional values of the angle of arrival are generated based on equation (5) from the measured value of the angle of arrival represented by the triangle pointing down.

Thus, the triangles pointing up represent virtual targets generated based on the detected target represented by the triangle pointing down.

FIG. 6 shows an embodiment in which the additional values of the angle of arrival vary depending on the radial velocity value. This may be the case in embodiments, for example, which pertain to a TDM-MIMO radar sensor. However, in some embodiments, for example, which pertain to a SIMO radar sensor, the additional values of the angle of arrival may equal each other and may be equal to the corresponding measured value of the angle of arrival. In some embodiments, a dependence of the value of the angle of arrival from the radial velocity value may be present but may be negligible.

FIG. 7 shows the diagram of FIG. 6 with virtual targets, represented by circles, generated for each of the detected targets represented by squares. Each virtual target indicates an additional value of a radial velocity and an additional value of an angle of arrival and is generated based on the same algorithm as the virtual targets represented by the triangles pointing up.

The positions of the detected and virtual targets lie on (or close to) a set of dashed sloping lines 14-1 to 14-9 that have an equidistant vertical spacing which corresponds to the velocity detection range of the radar sensor(s).

The sloping lines 14-1 to 14-9 may be generated based on the assumption that the detected targets are stationary targets, i.e. targets that do not move with respect to an environment of the mobile platform, e.g. to a road on which the mobile platform is driving, or targets whose velocity is negligible compared to the velocity of the mobile platform. For example, the same targets may be used for generating the virtual targets and for radial velocity disambiguation that have been used for the ego-motion estimation.

The sloping lines 14-1 to 14-9 may be estimated using a Random Sample Consensus (RANSAC) algorithm or using a least-squares algorithm. Detected and virtual targets that deviate more than a predefined threshold from the closest one of the sloping lines 14-1 to 14-9 may be filtered out as noise.

The spacing between the sloping lines 14-1 to 14-9 may equal the velocity detection rage of the radar sensor(s) and may be a predetermined value. The offset and slope of the sloping lines 14-1 to 14-9 may, in some embodiments, depend on the estimated ego-motion. For example, if the mobile platform is moving in forward direction, i.e. $v_x \neq 0$ and $v_y = \omega = 0$, one of the generated sloping lines may be defined by the points $(\cos(\phi)=0, v_r=0)$ and $(\cos(\phi)=1, v_r=v_x)$. In a case where $v_y \neq 0$ and/or $\omega \neq 0$, these points may be transformed as known in the art.

Therefore, in some embodiments, the sloping lines 14-1 to 14-9 may be calculated from the ego-motion or may be estimated based on a RANSAC algorithm or least-squares algorithm with initial parameters calculated from the ego-motion.

For determining, among the measured radial velocity values and the additional radial velocity values, unambiguous velocity values of the detected targets, a sloping line among the sloping lines 14-1 to 14-9 may be selected that complies most with the estimated ego-motion of the mobile platform, and, thus, represents a most probable motion of the mobile platform. In the example of FIG. 7, the sloping line 14-1 may be selected as sloping line that represents the most probable motion of the mobile platform.

For example, a sloping line may be selected from which the radial velocity values of the corresponding detected and virtual targets deviate least. Or, for example, a sloping line may be selected based on the ego-motion of the mobile platform, e.g. that includes, in a case of forward movement of the mobile platform, i.e. $v_x \neq 0$ and $v_y = \omega = 0$, at least one of the points $(\cos(\phi)=0, v_r=0)$ and $(\cos(\phi)=1, v_r=v_x)$, or that deviates least from at least one of these points, such as the sloping line 14-5 in FIG. 7.

Then, the radial velocity values included in the selected sloping line 14-5 or deviating from the selected sloping line 14-5 less than a threshold (e.g. less than half of the velocity detection range, i.e. less than $v_{max}$) may be determined as unambiguous radial velocity values. If an unambiguous radial velocity value is a measured radial velocity value, it is determined as the unambiguous radial velocity of the corresponding detected target. If an unambiguous radial velocity value is an additional radial velocity value, it is determined as the unambiguous radial velocity value of the corresponding detected target from which the corresponding virtual target has been generated.

However, in some embodiments, only one sloping line 14-5 may be generated based on the ego-motion, as described above. Then, for detected targets that lie on this one generated sloping line 14-5 or that deviate from it by less than threshold (e.g. a half velocity detection range), the measured radial velocity value may be determined to be the unambiguous radial velocity value, and for detected targets that deviate from this one generated sloping line 14-5 by more than a threshold (e.g. a half velocity detection range), the unambiguous radial velocity value may be determined by shifting the measured radial velocity value by a multiple of the velocity detection range to deviate from this one generated sloping line 14-5 by less than the threshold (e.g. the half velocity detection range).

Based on the sloping line 14-5 that represents the most probable motion of the mobile platform, a correct (unambiguous) radial velocity value and a correct (unambiguous) value of an angle of arrival of the detected stationary targets may be estimated. For example, in some embodiments, unambiguous values of the radial velocity and of the angle of arrival may be estimated for one stationary target, for all stationary targets, or for an arbitrary number of stationary targets.

In some embodiments, the determining of the radial velocity values that are consistent with the ego-motion of the mobile platform is based on a Random Sample Consensus (RANSAC) algorithm. For example, a few (e.g. two or three) radial velocity values may be selected randomly from the measured radial velocity values of the detected targets and the additional radial velocity values of the virtual targets, sloping lines, such as sloping lines 14-1 to 14-9, may be generated based on the few selected radial velocity values, deviations of the other measured and additional radial velocity values may be calculated, and a consensus set including the measured and additional radial velocity values with deviations from the generated sloping lines smaller than a threshold may be determined. These steps may be repeated several times for different randomly selected points. Finally, the largest determined consensus set may be used to estimate final sloping lines based on a least-squares algorithm.

In some embodiments, the circuitry is configured to add a correction term to a value of an angle of arrival indicated by the radar detection data, the correction term depending on the radial velocity value of the corresponding target. For example, if a value of an angle of arrival measured for a target may need to be corrected depending on the unambiguous radial velocity value of the target, as may be the case, e.g., for a TDM-MIMO radar sensor, a correction term may be calculated based on equations (3) to (5).

In some embodiments, the target for which an unambiguous radial velocity value is determined is a stationary target. A stationary target may be any target that does not move with respect to an environment of the mobile platform in which environment the mobile platform is moving, e.g., in a case where the mobile platform is a vehicle, with respect to a road on which the mobile platform is driving. A stationary target may also be any target that moves with respect to the environment of the mobile platform so slowly that the motion cannot be detected, or that the motion can be detected but is negligible. Examples of stationary targets may include parking vehicles, road signs, trees, buildings and standing or sitting pedestrians or animals or the like.

In some embodiments, at least one target of the plurality of targets detected by the radar sensor(s) is a moving target, and the circuitry is configured to distinguish between a stationary target and a moving target in the plurality of targets based on a statistical analysis of the radar detection data.

A moving target may be any target that is moving with respect to a road on which the mobile platform is driving and/or the environment of the mobile platform in which the mobile platform is moving. Examples of moving targets may include other (driving) vehicles, cyclists, walking pedestrians and walking or flying animals.

For example, the moving target(s) may be distinguished from the stationary target(s) based on the assumption that the stationary targets form a biggest group following a consistent velocity profile in the radar detection data.

The distinction between the moving target(s) and the stationary target(s) may be included in the RANSAC regression for estimating the ego-motion of the mobile platform, e.g. based on equation (15), or may be implemented separately.

In some embodiments, the ego-motion of the mobile platform includes a longitudinal velocity $v_x$, a lateral velocity $v_y$ and a yaw rate w of the mobile platform. As mentioned previously, the ego-motion may also include any other quantity suitable for determining a motion of the mobile platform, for example a vertical velocity, a pitch rate and/or a roll rate.

In some embodiments, the radial velocity of the plurality of targets indicated by the radar detection data is based on Doppler radar sensing. For example, the radar sensor(s) of the mobile platform may determine a frequency shift in a received radar signal with respect to an emitted radar signal, and may calculate a radial velocity value based on the frequency shift.

In some embodiments, the radar sensor(s) include a Multiple-Input Multiple-Output (MIMO) radar sensor configured to acquire the radar detection data based on Time Division Multiplexing (TDM). The MIMO radar sensor may include a plurality of transmission antennae configured to emit a radar signal, and a plurality of reception antennae configured to receive a radar signal. TDM may include emitting, during a first time slot, a radar signal with a first transmission antenna and not with a second transmission antenna, and emitting, during a second time slot, a radar signal with the second transmission antenna and not with the first transmission antenna, wherein the first time slot and the second time slot do not overlap, thus ensuring an orthogonality between the first transmission antenna and the second transmission antenna in the time domain.

However, the present disclosure is not limited to TDM-MIMO Doppler radar sensors. Any radar sensor or combination of radar sensors suitable for obtaining a radial velocity and an angle of arrival of targets with respect to the radar sensor or combination of radar sensors may be used. For example, in some embodiments, the radar sensor(s) may include a single antenna rotating radar sensor or the like.

In some embodiments, the mobile platform includes a plurality of radar sensors, and the radar detection data include data acquired by the plurality of radar sensors.

In some embodiments, a mobile platform includes at least one radar sensor, and the circuitry configured as described above.

In some embodiments, a method for radar detection data disambiguation for a mobile platform includes obtaining radar detection data from a radar sensor mounted on the mobile platform, wherein the radar detection data indicate, for each of a plurality of targets, a radial velocity and an angle of arrival; estimating, based on the radar detection data, an ego-motion of the mobile platform; and determining an unambiguous radial velocity value of a target of the plurality of targets based on the ego-motion and the radar detection data.

The method may be configured as described above for the circuitry and, in some embodiments, each feature which is configured by the circuitry is a feature of the method, such that all explications made for the circuitry fully apply to the method.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 8, there is depicted a circuitry 2 according to an embodiment of the present disclosure.

The circuitry 2 includes a moving target filtering unit 15, an ego-motion estimation unit 16 and a radar detection data disambiguation unit 17.

The circuitry 2 receives radar detection data from one or more radar sensors 3 mounted on a mobile platform (e.g. on the vehicle 1). The radar detection data indicate, for each of a plurality of targets detected by the radar sensor(s) 3, a value of a radial velocity $v_r$ and a value of an angle of arrival $\phi$. In some embodiments, the radar detection data also indicate a distance between a target and a radar sensor 3. The radar sensor(s) 3 may include a TDM-MIMO radar sensor or any other radar sensor suitable for acquiring the radar detection data.

The circuitry 2 provides the radar detection data to the moving target filtering unit 15.

The moving target filtering unit 15 receives the radar detection data that indicate the values of a radial velocity $v_r$ of the detected targets and the values of an angle of arrival $\phi$ of the detected targets.

The moving target filtering unit 15 filters out values corresponding to moving targets, including values of a radial velocity $v_r$ and of an angle of arrival $\phi$ of the moving targets, from the radar detection data, and outputs the remaining radar detection data, which include values of a radial velocity $v_r$ and of an angle of arrival $\phi$ of stationary targets. The moving target filtering unit 15 provides the remaining radar detection data to the ego-motion estimation unit 16 and to the radar detection data disambiguation unit 17.

The moving target filtering unit 15 distinguishes between a stationary target and a moving target in the plurality of targets of the radar detection data based on a statistical analysis, for example based on the assumption that stationary targets form a biggest group following a consistent velocity profile among all targets of the radar detection data.

Although the moving target filtering unit 15 is drawn separately from the ego-motion estimation unit 16, the moving target filtering unit 15 may be included in the ego-motion estimation unit 16, and the moving targets may be filtered out of the radar detection data in the course of the ego-motion estimation.

In some embodiments, the circuitry 2 may not include the moving target filtering unit 15, for example when it is assumed that the mobile platform moves within an environment that does not contain moving objects.

The ego-motion estimation unit 16 receives the radar velocity data including values of a radial velocity $v_r$ and of an angle of arrival $\phi$ of stationary targets, and receives the mounting position(s), which may include a x-component $x^P$ and a y-component $y^P$, of the radar sensor(s) 3 and the mounting angle(s) $\beta$ of the radar sensor(s) 3. The mounting position(s) and the mounting angle(s) of the radar sensor(s) may be predetermined values and may be read from a memory, for example.

The ego-motion estimation unit 16 estimates an ego-motion of the mobile platform, for example based on equation (15), as described above. The ego-motion estimation unit 16 outputs ego-motion information corresponding to the estimated ego-motion of the mobile platform. The ego-motion information indicates values of a longitudinal velocity $v_x$, a lateral velocity $v_y$, and a yaw rate $\omega$.

As mentioned above, the ego-motion information may, in some embodiments, not indicate a value of one or more of a longitudinal velocity $v_x$, a lateral velocity $v_y$ and a yaw rate $\omega$, and/or may, in some embodiments, indicate a value of an additional motion variable such as a vertical velocity, a roll rate and/or a pitch rate.

The ego-motion estimation unit 16 provides the ego-motion information to the radar detection data disambiguation unit 17.

The radar detection data disambiguation unit 17 includes a virtual target generation unit 18, a sloped line generation unit 19, a radial velocity value selection unit 20 and an angle of arrival value correction unit 21.

The radar detection data disambiguation unit 17 receives the radar detection data including values of a radial velocity $v_r$ and an angle of arrival $\phi$ of one or more stationary targets, receives the ego-motion information, and provides the radar detection data and the ego-motion information as needed to the virtual target generation unit 18, the sloped line generation unit 19, the radial velocity value selection unit 20 and the angle of arrival value correction unit 21.

The virtual target generation unit 18 generates, based on the detected targets and the corresponding measured values of a radial velocity $v_r$ and of an angle of arrival $\phi$, one or more virtual targets and corresponding additional values of a radial velocity $v_r$ and of an angle of arrival $\phi$, for example as described above with reference to FIG. 6 and FIG. 7.

The sloped line generation unit 19 generates one or more sloped lines that indicate a relation between (a cosine of) an angle of arrival $\phi$ and a radial velocity $v_r$, based on a RANSAC algorithm, a least-squares algorithm and/or the ego-motion information, as described above with reference to FIG. 7.

The radial velocity value selection unit 20 selects, for at least one detected target, an unambiguous radial velocity value among radial velocity values of the detected target or of a virtual target corresponding to the detected target, for example based on a sloped line, generated by the sloped line generation unit 19, that corresponds to the ego-motion of the mobile platform, as described above with reference to FIG. 7.

In some embodiments, the sloped line generation unit 19 generates the sloped line(s) based on virtual targets generated by the virtual target generation unit 18, and the radial velocity value selection unit 20 selects the unambiguous radial velocity values from among the detected and virtual targets.

In some embodiments, the sloped line generation unit 19 generates a sloped line solely based on the ego-motion information and on predetermined information about a configuration of the radar sensor(s) 3, which indicates a velocity detection range of the radar sensor(s) 3, and the radial velocity value selection unit 20 either selects, as unambiguous radial velocity value, a measured radial velocity value that deviates from the generated sloped line less than a threshold (e.g. a half velocity detection range of the radar sensor(s) 3), or causes the virtual target generation unit 18 to generate an additional radial velocity value that deviates from the generated sloped line less than a threshold (e.g. a half velocity detection range of the radar sensor(s) 3) and selects this additional radial velocity value as unambiguous radial velocity value.

The angle of arrival value correction unit 21 corrects, for the at least one detected target for which the radial velocity value selection unit 20 selects the unambiguous radial velocity value, a value of an angle of arrival, for example based on equations (3) to (5). If the selected unambiguous radial velocity value(s) are included in the velocity detection range of the radar sensor(s) 3, the corrected value of the angle of arrival may equal the measured value of the angel of arrival.

In some embodiments, the circuitry 2 does not include the angle of arrival value correction unit 21, for example in a case where the radar sensor(s) 3 include(s) a SIMO radar sensor that acquires values of an angle of arrival φ independent of corresponding values of a radial velocity $v_r$.

The radar detection data disambiguation unit 17 outputs the unambiguous radial velocity value(s) selected by the radial velocity value selection unit 20 and outputs the value(s) of the angle of arrival corrected by the correction unit 21. In a case where the radar detection data disambiguation unit 17 does not include the angle of arrival value correction unit 21, the radar detection data disambiguation unit 17 may output only the unambiguous radial velocity value(s) selected by the radial velocity value selection unit 20.

The circuitry 2 outputs the unambiguous radial velocity value(s) output by the radar detection data disambiguation unit 17, and, if output by the radar detection data disambiguation unit 17, also outputs the corrected value(s) of the angle of arrival.

Figure 9:
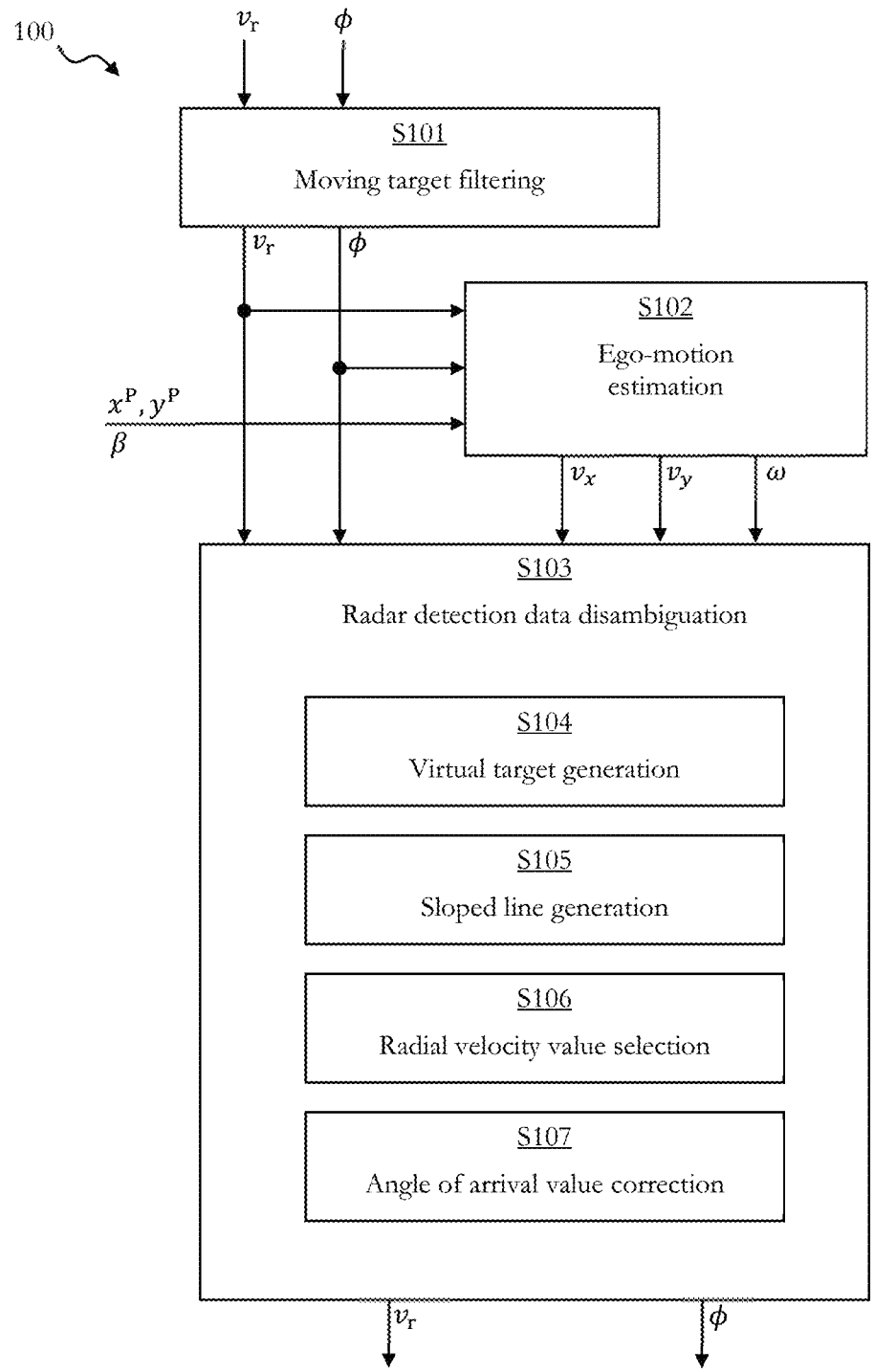
FIG. 9 is a block diagram illustrating a method according to an embodiment of the present disclosure.

FIG. 9 shows an embodiment of a method 100 for radar detection data disambiguation in a block diagram.

The method 100 uses radar detection data received from one or more radar sensors 3 mounted on a mobile platform (e.g. on the vehicle 1). The radar detection data indicate, for each of a plurality of targets detected by the radar sensor(s) 3, a value of a radial velocity $v_r$ and a value of an angle of arrival φ. In some embodiments, the radar detection data also indicate a distance between a target and a radar sensor 3. The radar sensor(s) 3 may include a TDM-MIMO radar sensor or any other radar sensor suitable for acquiring the radar detection data.

At S101, moving target filtering is performed based on the radar detection data that indicate the values of a radial velocity $v_r$ of the detected targets and the values of an angle of arrival φ of the detected targets.

The moving target filtering filters out values corresponding to moving targets, including values of a radial velocity $v_r$ and of an angle of arrival φ of the moving targets, from the radar detection data, and obtains the remaining radar detection data, which include values of a radial velocity $v_r$ and of an angle of arrival φ of stationary targets.

The moving target filtering distinguishes between a stationary target and a moving target in the plurality of targets of the radar detection data based on a statistical analysis, for example based on the assumption that stationary targets form a biggest group following a consistent velocity profile among all targets of the radar detection data.

Although the moving target filtering is drawn separately from the ego-motion estimation at S102, the moving target filtering may be included in the ego-motion estimation, and the moving targets may be filtered out of the radar detection data in the course of the ego-motion estimation.

In some embodiments, the method 100 may not include the moving target filtering, for example when it is assumed that the mobile platform moves within an environment that does not contain moving objects.

At S102, ego-motion estimation is performed, based on the radar velocity data including values of a radial velocity $v_r$ and of an angle of arrival φ of stationary targets, and on the mounting position(s), which may include a x-component $x^P$ and a y-component $y^P$, of the radar sensor(s) 3 and the mounting angle(s) β of the radar sensor(s) 3. The mounting position(s) and the mounting angle(s) of the radar sensor(s) 3 may be predetermined values and may be read from a memory, for example.

The ego-motion estimation estimates an ego-motion of the mobile platform, for example based on equation (15), as described above. The ego-motion estimation obtains ego-motion information corresponding to the estimated ego-motion of the mobile platform. The ego-motion information indicates values of a longitudinal velocity $v_x$, a lateral velocity $v_y$ and a yaw rate ω.

As mentioned above, the ego-motion information may, in some embodiments, not indicate a value of one or more of a longitudinal velocity $v_x$, a lateral velocity $v_y$ and a yaw rate ω, and/or may, in some embodiments, indicate a value of an additional motion variable such as a vertical velocity, a roll rate and/or a pitch rate.

At S103, radar detection data disambiguation is performed based on the radar detection data including values of a radial velocity $v_r$ and an angle of arrival φ of one or more stationary targets, and on the ego-motion information.

The radar detection data disambiguation includes a virtual target generation, a sloped line generation, a radial velocity value selection and an angle of arrival value correction.

At S104, the virtual target generation is performed, based on the detected targets and the corresponding measured values of a radial velocity $v_r$ and of an angle of arrival φ. The virtual target generation generates one or more virtual targets and corresponding additional values of a radial velocity $v_r$ and of an angle of arrival φ, for example as described above with reference to FIG. 6 and FIG. 7.

At S105, the sloped line generation is performed. The sloped line generation generates one or more sloped lines that indicate a relation between (a cosine of) an angle of arrival φ and a radial velocity $v_r$, based on a RANSAC algorithm, a least-squares algorithm and/or the ego-motion information, as described above with reference to FIG. 7.

At S106, the radial velocity value selection is performed. The radial velocity value selection selects, for at least one detected target, an unambiguous radial velocity value among radial velocity values of the detected target or of a virtual target corresponding to the detected target, for example based on a sloped line, generated by the sloped line generation, that corresponds to the ego-motion of the mobile platform, as described above with reference to FIG. 7.

In some embodiments, the sloped line generation generates the sloped line(s) based on virtual targets generated by the virtual target generation, and the radial velocity value selection selects the unambiguous radial velocity values from among the detected and virtual targets.

In some embodiments, the sloped line generation generates a sloped line solely based on the ego-motion information and on predetermined information about a configuration of the radar sensor(s) 3, which indicates a velocity detection range of the radar sensor(s) 3, and the radial velocity value selection either selects, as unambiguous radial velocity value, a measured radial velocity value that deviates from the generated sloped line less than a threshold (e.g. a half velocity detection range of the radar sensor(s) 3), or causes the virtual target generation to generate an additional radial velocity value that deviates from the generated sloped line less than a threshold (e.g. a half velocity detection range of the radar sensor(s) 3) and selects this additional radial velocity value as unambiguous radial velocity value.

At S107, the angle of arrival value correction is performed. The angle of arrival value correction corrects, for the at least one detected target for which the radial velocity value selection selects the unambiguous radial velocity value, a value of an angle of arrival, for example based on equations (3) to (5). If the selected unambiguous radial velocity value(s) are included in the velocity detection range of the radar sensor(s) 3, the corrected value of the angle of arrival may equal the measured value of the angel of arrival.

In some embodiments, the method 100 does not include the angle of arrival value correction, for example in a case where the radar sensor(s) 3 include (s) a SIMO radar sensor that acquires values of an angle of arrival φ independent of corresponding values of a radial velocity $v_r$.

The radar detection data disambiguation obtains the unambiguous radial velocity value(s) selected by the radial velocity value selection and obtains the value(s) of the angle of arrival corrected by the correction. In a case where the radar detection data disambiguation does not include the angle of arrival value correction, the radar detection data disambiguation may obtain only the unambiguous radial velocity value(s) selected by the radial velocity value selection.

The method 100 thus obtains the unambiguous radial velocity value(s) obtained by the radar detection data disambiguation, and, if obtained by the radar detection data disambiguation, also obtains the corrected value(s) of the angle of arrival.

In the following, examples of application of the technology according to the present disclosure are described.

The technology according to an embodiment of the present disclosure is applicable to various products. For example, the technology according to an embodiment of the present disclosure may be implemented as a device (e.g. as circuitry 2) included in a mobile body (mobile platform) that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 10:
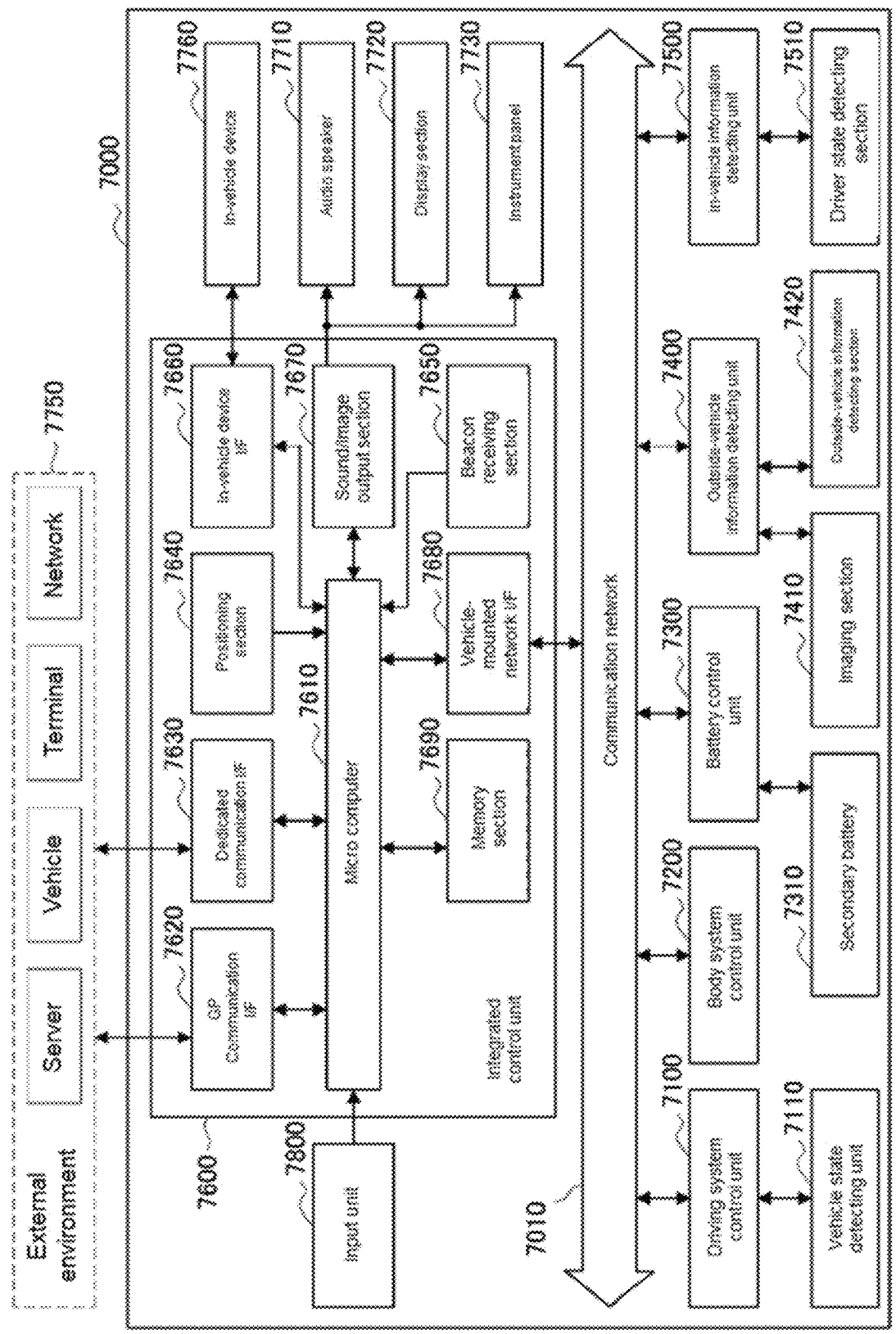
FIG. 10 is a block diagram depicting an example of schematic configuration of a vehicle control system according to an embodiment of the present disclosure.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 11:
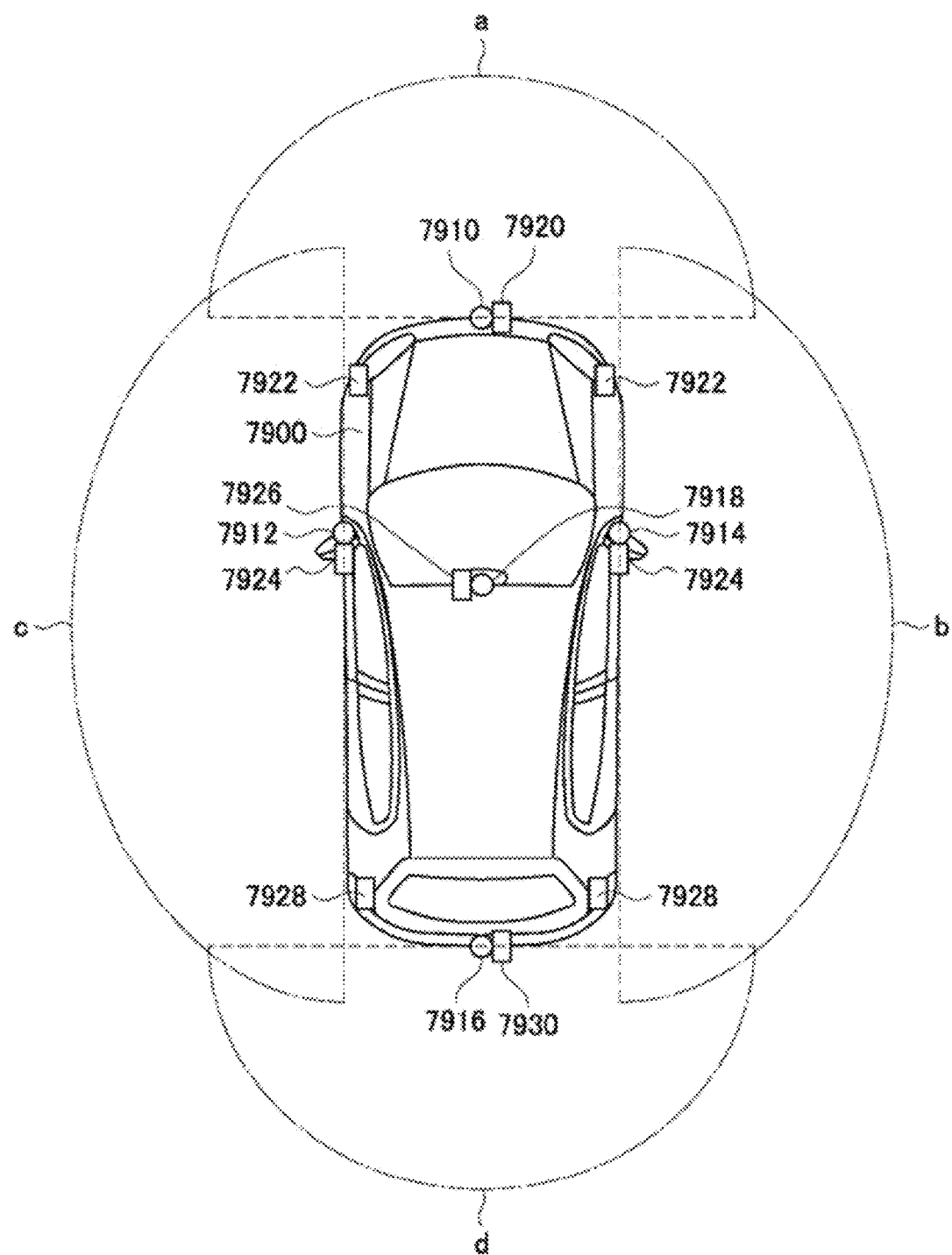
FIG. 11 is a diagram of assistance in explaining an example of installation positions of an outside-vehicle information detecting section and an imaging section according to an embodiment of the present disclosure.

FIG. 11 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the information processing device 100 according to the present embodiment described with reference to FIG. 10 can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

It should be recognized that the embodiments describe methods with an exemplary ordering of method steps. The specific ordering of method steps is however given for illustrative purposes only and should not be construed as binding. For example, the ordering of S101 and S102 in the embodiment of FIG. 9 may be exchanged. Also, the ordering of S104 and S105 in the embodiment of FIG. 9 may be exchanged. Further, S101 may also be executed between S104 and S105, or between S105 and S106 in the embodiment of FIG. 9. Other changes of the ordering of method steps may be apparent to the skilled person.

It should also be noted that the division of the control or circuitry of FIG. 10 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A circuitry for radar detection data disambiguation for a mobile platform, the circuitry being configured to:
 obtain radar detection data from a radar sensor mounted on the mobile platform, wherein the radar detection data indicate, for each of a plurality of targets, a radial velocity and an angle of arrival;
 estimate, based on the radar detection data, an ego-motion of the mobile platform; and
 determine an unambiguous radial velocity value of a target of the plurality of targets based on the ego-motion and the radar detection data.

(2) The circuitry of (1), wherein the determining of the unambiguous radial velocity value of the target is based on determining a radial velocity value that is consistent with the ego-motion of the mobile platform from a set of radial velocity values for the target that differ from each other by a multiple of a velocity detection range of the radar sensor.

(3) The circuitry of (2), wherein the determining of the unambiguous radial velocity value of the target includes:
 generating, based on the radar detection data and the ego-motion of the mobile platform, at least one additional radial velocity value by shifting a radial velocity value indicated by the radar detection data by a multiple of the velocity detection range of the radar sensor;
determining radial velocity values that are consistent with the ego-motion of the mobile platform among radial velocity values indicated by the radar detection data and the at least one additional radial velocity value; and
determining, as the unambiguous radial velocity value of the target, a radial velocity value corresponding to the target from the determined radial velocity values that are consistent with the ego-motion of the mobile platform.

(4) The circuitry of (3), wherein the determining of the radial velocity values that are consistent with the ego-motion of the mobile platform is based on a Random Sample Consensus algorithm.

(5) The circuitry of any one of (1) to (4), wherein the circuitry is further configured to add a correction term to a value of an angle of arrival indicated by the radar detection data, the correction term depending on the radial velocity value of the corresponding target.

(6) The circuitry of any one of (1) to (5), wherein the target is a stationary target.

(7) The circuitry of (6), wherein at least one target of the plurality of targets is a moving target; and
wherein the circuitry is configured to distinguish between a stationary target and a moving target in the plurality of targets based on a statistical analysis of the radar detection data.

(8) The circuitry of any one of (1) to (7), wherein the ego-motion of the mobile platform includes a longitudinal velocity, a lateral velocity and a yaw rate of the mobile platform.

(9) The circuitry of any one of (1) to (8), wherein the radial velocity of the plurality of targets indicated by the radar detection data is based on Doppler radar sensing.

(10) The circuitry of any one of (1) to (9), wherein the radar sensor includes a Multiple-Input Multiple-Output radar sensor configured to acquire the radar detection data based on Time Division Multiplexing.

(11) The circuitry of any one of (1) to (10), wherein the mobile platform includes a plurality of radar sensors, and the radar detection data include data acquired by the plurality of radar sensors.

(12) A mobile platform comprising:
at least one radar sensor, and
the circuitry of any one of (1) to (11).

(13) A method for radar detection data disambiguation for a mobile platform, the method comprising:
obtaining radar detection data from a radar sensor mounted on the mobile platform, wherein the radar detection data indicate, for each of a plurality of targets, a radial velocity and an angle of arrival;
estimating, based on the radar detection data, an ego-motion of the mobile platform; and
determining an unambiguous radial velocity value of a target of the plurality of targets based on the ego-motion and the radar detection data.

(14) The method of (13), wherein the determining of the unambiguous radial velocity value of the target is based on determining a radial velocity value that is consistent with the ego-motion of the mobile platform from a set of radial velocity values for the target that differ from each other by a multiple of a velocity detection range of the radar sensor.

(15) The method of (14), wherein the determining of the unambiguous radial velocity value of the target includes:
generating, based on the radar detection data and the ego-motion of the mobile platform, at least one additional radial velocity value by shifting a radial velocity value indicated by the radar detection data by a multiple of the velocity detection range of the radar sensor;
determining radial velocity values that are consistent with the ego-motion of the mobile platform among radial velocity values indicated by the radar detection data and the at least one additional radial velocity value; and
determining, as the unambiguous radial velocity value of the target, a radial velocity value corresponding to the target from the determined radial velocity values that are consistent with the ego-motion of the mobile platform.

(16) The method of (15), wherein the determining of the radial velocity values that are consistent with the ego-motion of the mobile platform is based on a Random Sample Consensus algorithm.

(17) The method of any one of (13) to (16), wherein the method further comprises adding a correction term to a value of an angle of arrival indicated by the radar detection data, the correction term depending on the radial velocity value of the corresponding target.

(18) The method of any one of (13) to (17), wherein the target is a stationary target.

(19) The method of (18), wherein at least one target of the plurality of targets is a moving target; and
wherein the method comprises distinguishing between a stationary target and a moving target in the plurality of targets based on a statistical analysis of the radar detection data.

(20) The method of any one of (13) to (19), wherein the ego-motion of the mobile platform includes a longitudinal velocity, a lateral velocity and a yaw rate of the mobile platform.

(21) The method of any one of (13) to (20), wherein the radial velocity of the plurality of targets indicated by the radar detection data is based on Doppler radar sensing.

(22) The method of any one of (13) to (21), wherein the radar sensor includes a Multiple-Input Multiple-Output radar sensor configured to acquire the radar detection data based on Time Division Multiplexing.

(23) The method of any one of (13) to (22), wherein the mobile platform includes a plurality of radar sensors, and the radar detection data include data acquired by the plurality of radar sensors.

(24) A computer program comprising instructions which, when the program is executed by a computer, cause the computer to carry out the method of anyone of (13) to (23).

(25) A non-transitory computer-readable storage medium having stored thereon the computer program product of (24).

The invention claimed is:
1. A circuitry for radar detection data disambiguation for a mobile platform, the circuitry being configured to:
obtain radar detection data from a radar sensor mounted on the mobile platform, wherein the radar detection data indicate, for each of a plurality of targets, a radial velocity and an angle of arrival;
estimate, based on the radar detection data, an ego-motion of the mobile platform;
determine an unambiguous radial velocity value of a target of the plurality of targets based on the ego-motion and the radar detection data, wherein the circuitry for determining the unambiguous radial velocity value is further configured to
generate a plurality of sloping lines in a coordinate system having radial velocity on one axis and cosine of angle of arrival on another axis, wherein the sloping lines have an equidistant vertical spacing corresponding to a velocity detection range of the radar sensor, select one of the plurality of sloping lines that most complies with the estimated ego-motion, and determine the unambiguous radial velocity value based on the selected sloping line; and control operation of the mobile platform based on the determined unambiguous radial velocity value, wherein controlling operation includes one or more of adjusting a driving force of the mobile platform, adjusting a steering angle of the mobile platform, and adjusting a braking force of the mobile platform.

2. The circuitry of claim 1, wherein the determining of the unambiguous radial velocity value of the target is based on determining a radial velocity value that is consistent with the ego-motion of the mobile platform from a set of radial velocity values for the target that differ from each other by a multiple of a velocity detection range of the radar sensor.

3. The circuitry of claim 2, wherein the determining of the unambiguous radial velocity value of the target includes:

generating, based on the radar detection data and the ego-motion of the mobile platform, at least one additional radial velocity value by shifting a radial velocity value indicated by the radar detection data by a multiple of the velocity detection range of the radar sensor;

determining radial velocity values that are consistent with the ego-motion of the mobile platform among radial velocity values indicated by the radar detection data and the at least one additional radial velocity value; and determining, as the unambiguous radial velocity value of the target, a radial velocity value corresponding to the target from the determined radial velocity values that are consistent with the ego-motion of the mobile platform.

4. The circuitry of claim 3, wherein the determining of the radial velocity values that are consistent with the ego-motion of the mobile platform is based on a Random Sample Consensus algorithm.

5. The circuitry of claim 1, wherein the circuitry is further configured to add a correction term to a value of an angle of arrival indicated by the radar detection data, the correction term depending on the radial velocity value of the corresponding target.

6. The circuitry of claim 1, wherein the target is a stationary target.

7. The circuitry of claim 6, wherein at least one target of the plurality of targets is a moving target; and wherein the circuitry is configured to distinguish between a stationary target and a moving target in the plurality of targets based on a statistical analysis of the radar detection data.

8. The circuitry of claim 1, wherein the ego-motion of the mobile platform includes a longitudinal velocity, a lateral velocity and a yaw rate of the mobile platform.

9. The circuitry of claim 1, wherein the radial velocity of the plurality of targets indicated by the radar detection data is based on Doppler radar sensing.

10. The circuitry of claim 1, wherein the radar sensor includes a Multiple-Input Multiple-Output radar sensor configured to acquire the radar detection data based on Time Division Multiplexing.

11. A method for radar detection data disambiguation for a mobile platform, the method comprising:

obtaining radar detection data from a radar sensor mounted on the mobile platform, wherein the radar detection data indicate, for each of a plurality of targets, a radial velocity and an angle of arrival;

estimating, based on the radar detection data, an ego-motion of the mobile platform;

determining an unambiguous radial velocity value of a target of the plurality of targets based on the ego-motion and the radar detection data;

generating a plurality of sloping lines in a coordinate system having radial velocity on one axis and cosine of angle of arrival on another axis, wherein the sloping lines have an equidistant vertical spacing corresponding to a velocity detection range of the radar sensor;

selecting one of the plurality of sloping lines that most complies with the estimated ego-motion;

determining the unambiguous radial velocity value based on the selected sloping line; and controlling operation of the mobile platform based on the determined unambiguous radial velocity value, wherein controlling operation includes one or more of adjusting a driving force of the mobile platform, adjusting a steering angle of the mobile platform, and adjusting a braking force of the mobile platform.

12. The method of claim 11, wherein the determining of the unambiguous radial velocity value of the target is based on determining a radial velocity value that is consistent with the ego-motion of the mobile platform from a set of radial velocity values for the target that differ from each other by a multiple of a velocity detection range of the radar sensor.

13. The method of claim 12, wherein the determining of the unambiguous radial velocity value of the target includes:

generating, based on the radar detection data and the ego-motion of the mobile platform, at least one additional radial velocity value by shifting a radial velocity value indicated by the radar detection data by a multiple of the velocity detection range of the radar sensor;

determining radial velocity values that are consistent with the ego-motion of the mobile platform among radial velocity values indicated by the radar detection data and the at least one additional radial velocity value; and determining, as the unambiguous radial velocity value of the target, a radial velocity value corresponding to the target from the determined radial velocity values that are consistent with the ego-motion of the mobile platform.

14. The method of claim 13, wherein the determining of the radial velocity values that are consistent with the ego-motion of the mobile platform is based on a Random Sample Consensus algorithm.

15. The method of claim 11, wherein the method further comprises adding a correction term to a value of an angle of arrival indicated by the radar detection data, the correction term depending on the radial velocity value of the corresponding target.

16. The method of claim 11, wherein the target is a stationary target.

17. The method of claim 16, wherein at least one target of the plurality of targets is a moving target; and wherein the method comprises distinguishing between a stationary target and a moving target in the plurality of targets based on a statistical analysis of the radar detection data.

18. The method of claim 11, wherein the ego-motion of the mobile platform includes a longitudinal velocity, a lateral velocity and a yaw rate of the mobile platform.

19. The method of claim 11, wherein the radial velocity of the plurality of targets indicated by the radar detection data is based on Doppler radar sensing.

20. The method of claim 11, wherein the radar sensor includes a Multiple-Input Multiple-Output radar sensor configured to acquire the radar detection data based on Time Division Multiplexing.

* * * * *